(12) United States Patent
Bora et al.

(10) Patent No.: US 9,880,758 B1
(45) Date of Patent: Jan. 30, 2018

(54) DATA TRANSFER TECHNIQUES WITH DATA REPLICATION

(71) Applicant: EMC IP Holding Company LLC, Hopkinton, MA (US)

(72) Inventors: Bhaskar Bora, Karnataka (IN); Benjamin Yoder, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 130 days.

(21) Appl. No.: 14/672,652

(22) Filed: Mar. 30, 2015

(51) Int. Cl.
*G06F 12/00* (2006.01)
*G06F 3/06* (2006.01)

(52) U.S. Cl.
CPC .......... *G06F 3/0619* (2013.01); *G06F 3/0665* (2013.01); *G06F 3/0689* (2013.01); *G06F 2003/0692* (2013.01)

(58) Field of Classification Search
None
See application file for complete search history.

(56) References Cited

U.S. PATENT DOCUMENTS

| 5,544,347 A | 8/1996 | Yanai et al. |
| 5,742,792 A | 4/1998 | Yanai et al. |
| 6,968,369 B2 | 11/2005 | Veprinsky et al. |
| 7,054,883 B2 | 5/2006 | Meiri et al. |
| 7,113,945 B1 * | 9/2006 | Moreshet ............... G06F 3/0608 707/999.002 |
| 2007/0226230 A1 * | 9/2007 | Zohar ................. G06F 11/2074 714/E11.107 |
| 2007/0234108 A1 * | 10/2007 | Cox ..................... G06F 11/2074 714/6.12 |

* cited by examiner

*Primary Examiner* — Prasith Thammavong
*Assistant Examiner* — Jason Blust
(74) *Attorney, Agent, or Firm* — Muirhead and Saturnelli, LLC

(57) ABSTRACT

Described are data replication techniques. Writes of cycle N directed to a first storage device of a first data storage system are received. Writes of cycle N−1 directed to the first storage device are transmitted to a second data storage system. Writes of cycle N−2 directed to the first storage device are applied to a second storage device of the second data storage system. An acknowledgement regarding cycle N−1 is sent to the first data storage system responsive to determining that the writes of cycle N−1 directed to the first storage device have been received by the second data storage system and that the writes of cycle N−2 have been applied to the second storage device. At least some writes of cycle N directed to the first storage device are transmitted to the second data storage system prior to the first data storage system receiving the acknowledgement regarding cycle N−1.

18 Claims, 18 Drawing Sheets

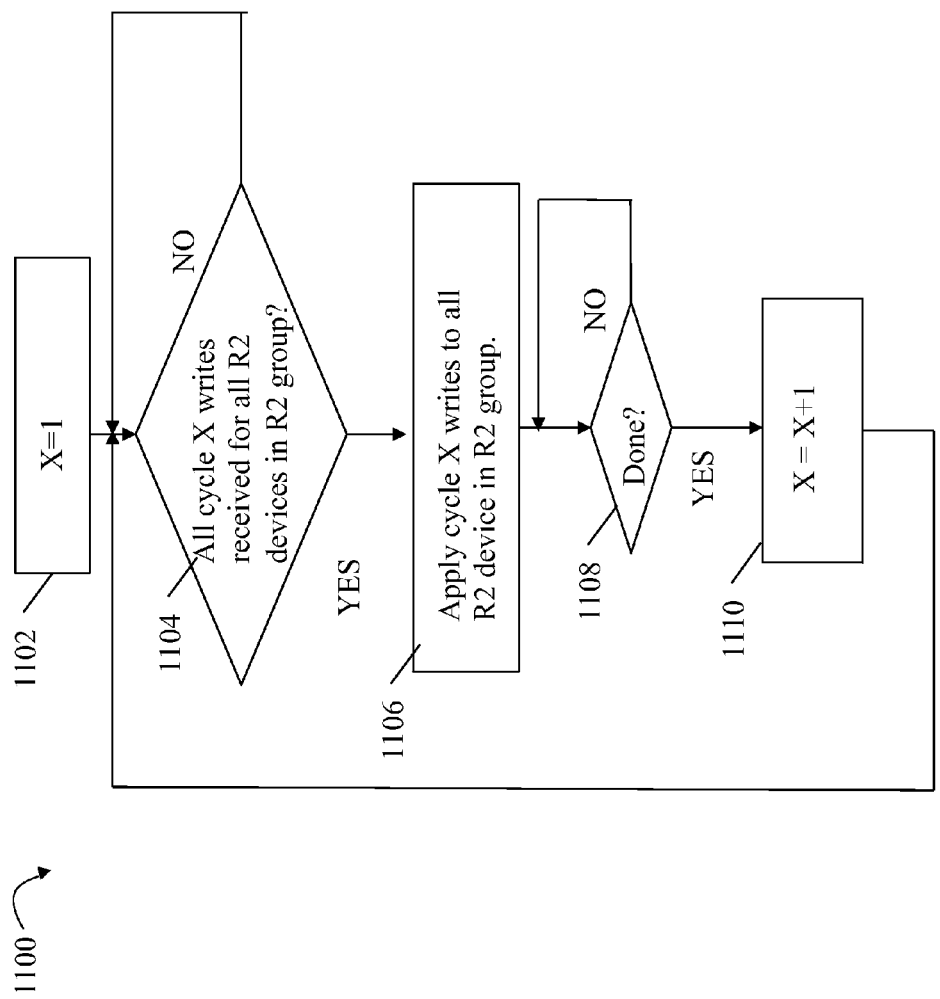

DATA TRANSFER TECHNIQUES WITH DATA REPLICATION

BACKGROUND

Technical Field

This application generally relates to data storage and more particularly to techniques used in connection with data replication.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems, hosts and other components may be interconnected by one or more communication connections such as in a network configuration. The network may support transmissions in accordance with well-known protocols such as TCP/IP (Transmission Control Protocol/Internet Protocol), UDP (User Datagram Protocol), and the like. Networked storage systems, such as data storage arrays, may be used to maintain data on different systems in different locations. Such mirroring may be used for a variety of reasons including reducing the likelihood of data loss. For example, in some implementations, a primary or source data site, such as a first or primary data storage system, may be configured in a partner relationship with a second or remote data storage system whereby the second data storage system includes a mirror or copy of data of one or more devices of the first data storage system.

SUMMARY OF THE INVENTION

In accordance with one aspect of the invention is a method of performing data replication comprising: receiving writes of cycle N that are directed to a first storage device of a first data storage system, N being an integer identifying a particular time period during which writes directed to the first storage device are received; transmitting writes of cycle N−1 directed to the first storage device from the first data storage system to a second data storage system; applying writes of cycle N−2 directed to the first storage device to a second storage device of the second data storage system; determining when the writes of cycle N−1 directed to the first storage device have been received by the second data storage system and when the writes of cycle N−2 directed to the first storage device have been applied to the second storage device; sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device; and transmitting at least some of the writes of cycle N directed to the first storage device from the first data storage system to the second data storage system prior to the first data storage system receiving the acknowledgement regarding cycle N−1. The first storage device and the second storage device may be logical devices. No write from cycle N−1 directed to the first storage device may be applied to the second storage device until all writes of cycle N−2 directed to the first storage device are applied to the second storage device. No write from cycle N directed to the first storage device may be applied to the second storage device until all writes of cycle N−1 directed to the first storage device are applied to the second storage device. The method may also include performing a cycle switch to set a current cycle number to N responsive to the first data storage system receiving the acknowledgement regarding cycle N−1, wherein transmitting at least some of the writes of cycle N that are directed to the first storage device to the second data storage system is performed prior to performing the cycle switch to cycle N. A pre-transfer limit may be specified denoting a maximum number of cycles for which a pre-cycle transfer of writes to the second data storage system is allowed. The pre-transfer limit may denote a maximum allowable difference between the current cycle number on the first data storage system and a cycle X of writes directed to the first storage device, wherein at least some of the writes of cycle X directed to the first storage device have been transmitted from the first data storage system to the second data storage system and wherein a first acknowledgement regarding cycle X has not yet been received at the first data storage system, wherein X is an integer and the first acknowledgement indicates that the writes of cycle X directed to the first storage device have been received at the second data storage system and that writes of cycle X−1 directed to the first storage device have been applied to the second storage device. The method may include responsive to the first data storage system completing transmission of cycle N−1 writes directed to the first storage device, sending, from the first data storage system to the second data storage system, a commit message for cycle N−1 writes. The commit message includes information may be used by the second data storage system to determine whether all writes of cycle N−1 directed to the first storage device have been received. At least some of the writes of cycle N directed to the first storage device may be received at the second data storage system prior to receiving all writes of cycle N−1 directed to the first storage device. No write of cycle N directed to the first storage device may be applied to the second storage device prior to applying all writes of cycle N−1 directed to the first storage device. The method may include sending first one or more messages from the first data storage system to the second data storage system, said first one or more messages including first one or more writes of cycle N−1 directed to the first storage device, wherein each of said first one or more messages includes an identifier denoting that the first one or more writes are included in cycle N−1; and sending second one or more messages from the first data storage system to the second data storage system, said second one or more messages including second one or more writes of cycle N directed to the first storage device, wherein each of said second one or more messages includes an identifier denoting that the second one or more writes are included in cycle N. The second data storage system may determine that writes of cycle N−1 directed to the first storage device have been applied to the second storage device when write data of each write included in cycle N−1 directed to the first storage device is any of: stored as write pending data in a cache of the second data storage system, and destaged to a location on a physical storage device provisioned for the second storage device.

In accordance with another aspect of the invention is a system comprising: a first data storage system; a second data storage system; a first memory of the first data storage system comprising code, that when executed, performs first processing comprising: receiving writes of cycle N that are directed to a first storage device of the first data storage system, N being an integer identifying a particular time period during which writes directed to the first storage device are received; transmitting writes of cycle N−1 directed to the first storage device from the first data storage system to the second data storage system; a second memory of the second data storage system comprising code, that when executed, performs second processing comprising: applying writes of cycle N−2 directed to the first storage device to a second storage device of the second data storage system; determining when the writes of cycle N−1 directed to the first storage device have been received by the second data storage system and when the writes of cycle N−2 directed to the first storage device have been applied to the second storage device; sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device; and wherein the first processing further comprises transmitting at least some of the writes of cycle N directed to the first storage device from the first data storage system to the second data storage system prior to the first data storage system receiving the acknowledgement regarding cycle N−1.

In accordance with another aspect of the invention is a computer readable medium comprising code stored thereon that, when executed, performs a method of performing data replication comprising: receiving writes of cycle N that are directed to a first group of storage devices of a first data storage system, N being an integer identifying a particular time period during which writes directed to the first group of storage devices are received; transmitting writes of cycle N−1 directed to the first group of storage devices from the first data storage system to a second data storage system; applying writes of cycle N−2 directed to the first group of storage devices to a second group of storage devices of the second data storage system; determining when the writes of cycle N−1 directed to the first group of storage devices have been received by the second data storage system and when the writes of cycle N−2 directed to the first group of storage devices have been applied to the second group of storage devices; sending, from the second data storage system to the first data storage system for each storage device in the first group, an acknowledgement regarding cycle N−1 directed to each storage device of the first group responsive to determining that the writes of cycle N−1 directed to said each storage device of the first group have been received by the second data storage system and that the writes of cycle N−2 directed to said each storage device of the first group have been applied to a corresponding storage device of the second group of storage devices; and transmitting at least some of the writes of cycle N directed to a first storage device of the first group of storage devices from the first data storage system to the second data storage system prior to the first data storage system receiving the acknowledgement regarding cycle N−1 directed to the first storage device. The first storage device and the second storage device may be logical devices. No write from cycle N−1 directed to the first storage device may be applied to the second storage device until all writes of cycle N−2 directed to the first storage device are applied to the second storage device. No write from cycle N directed to the first storage device may be applied to the second storage device until all writes of cycle N−1 directed to the first storage device are applied to the second storage device. The method may include performing a cycle switch to set a current cycle number to N responsive to the first data storage system receiving the acknowledgement regarding cycle N−1, wherein transmitting at least some of the writes of cycle N that are directed to the first storage device to the second data storage system is performed prior to performing the cycle switch to cycle N. A pre-transfer limit may be specified denoting a maximum number of cycles for which a pre-cycle transfer of writes to the second data storage system is allowed.

BRIEF DESCRIPTION OF THE DRAWINGS

Features and advantages of the present invention will become more apparent from the following detailed description of exemplary embodiments thereof taken in conjunction with the accompanying drawings in which:

FIG. 17 is a flowchart of processing steps that may be performed in an embodiment in accordance with techniques herein.

DETAILED DESCRIPTION OF EMBODIMENT(S)

Figure 1:
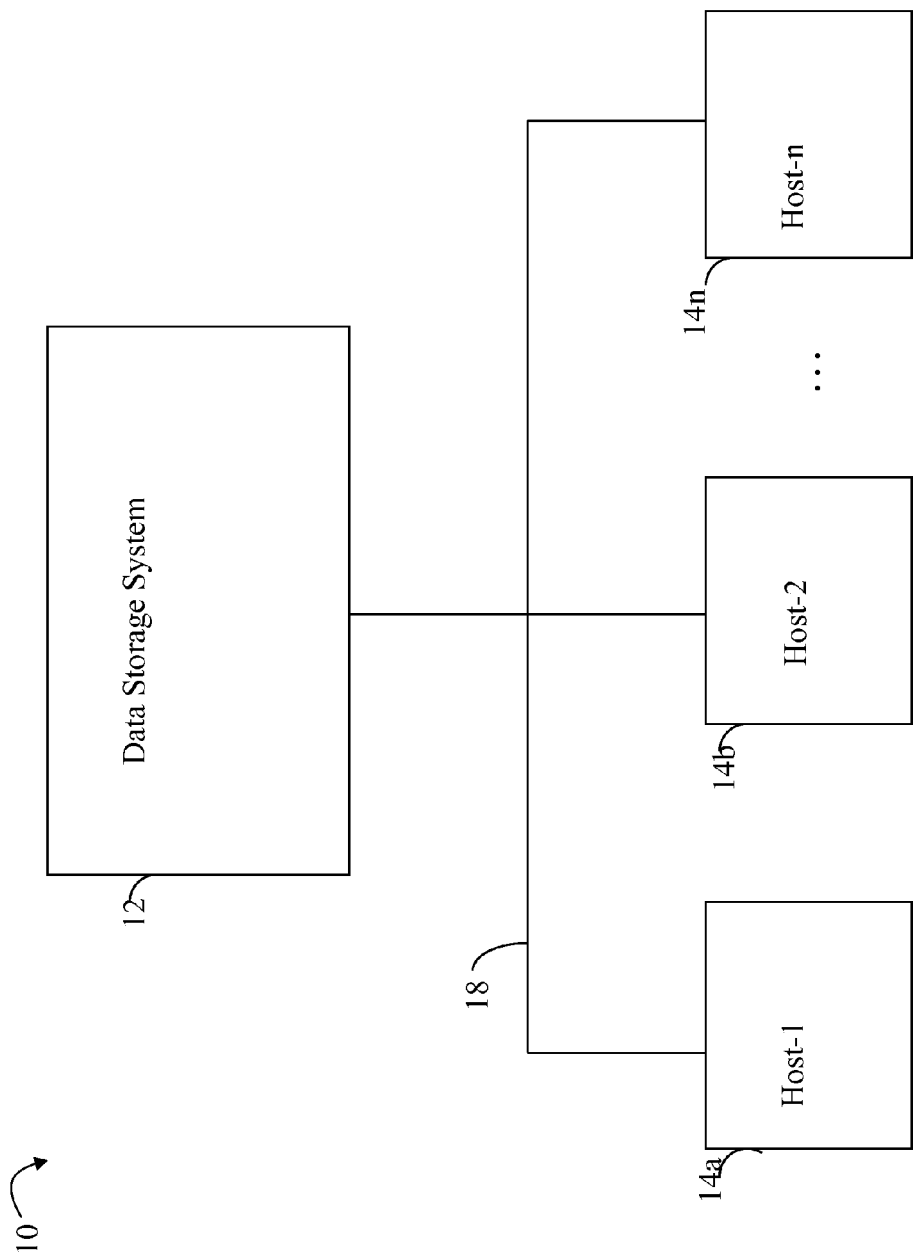
FIG. 1 is an example of an embodiment of a computer system that may utilize the techniques described herein.

Referring now to FIG. 1, shown is an example of an embodiment of a system that may be used in performing the techniques described herein. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as SCSI, ESCON, Fibre Channel, iSCSI, or GIGE (Gigabit Ethernet), and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Figure 2A:
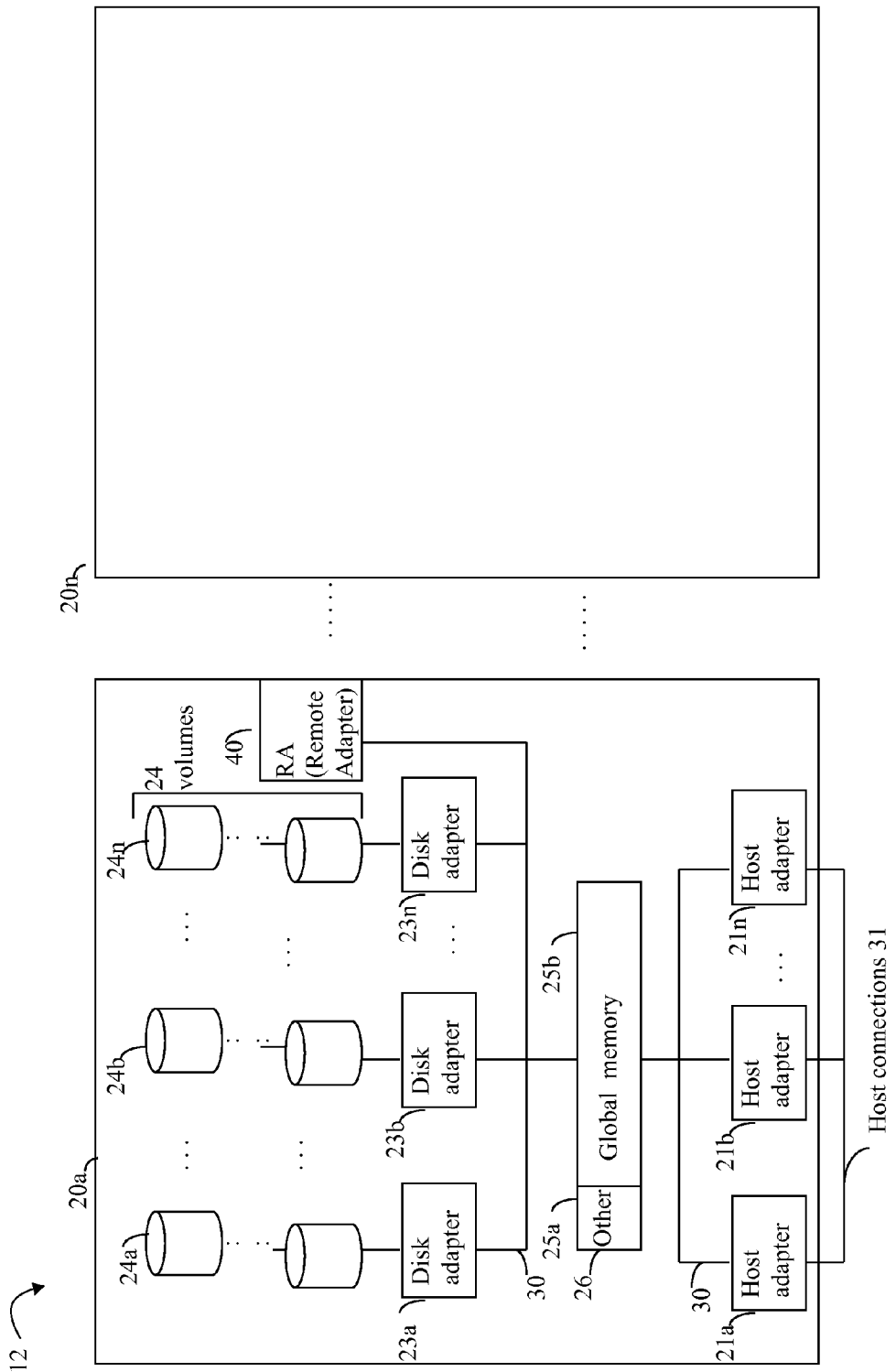
FIG. 2A is an example of an embodiment of a data storage system.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of data storage devices, such as disk devices or volumes, in an exemplary arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. The system 20a may also include one or more host adapters ("HAs") or directors 21a-21n. Each of these HAs may be used to manage communications and data operations between one or more host systems and the global memory. In an embodiment, the HA may be a Fibre Channel Adapter or other adapter which facilitates host communication.

Also shown in the storage system 20a is an RA or remote adapter 40. The RA may be hardware including a processor used to facilitate communication between data storage systems, such as between two of the same or different types of data storage systems. In one embodiment described in more detail in following paragraphs and figures, the RAs of the different data storage systems may communicate over a Gigabit Ethernet or Fibre Channel transmission channel supporting messaging traffic between data storage systems. The RA may be hardware including a processor used to facilitate communication between data storage systems, such as between two Symmetrix® data storage systems. The RA may be used with the Symmetrix Remote Data Facility (SRDF®) products provided by EMC Corporation of Hopkinton, Mass. SRDF® is a family of products that facilitates the data replication from one Symmetrix® storage array to another through a Storage Area Network (SAN) or and IP network. SRDF® logically pairs a device or a group of devices from each array and replicates data from one to the other synchronously or asynchronously. Generally, the SRDF® products are one example of commercially available products that may be used to provide functionality of a remote data facility (RDF) for use in an embodiment in connection with techniques herein.

One or more internal logical communication paths may exist between the DA's, the RA's, the HA's, and the memory 26. An embodiment, for example, may use one or more internal busses and/or communication modules. For example, the global memory portion 25b may be used to facilitate data transfers and other communications between the DA's, HA's and RA's in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting data storage devices may be any suitable storage device such as a rotating disk drive, flash-based storage, and the like. The particular data storage system as described in this embodiment, or a particular device thereof, such as a rotating disk or solid state storage device (e.g., a flash-based storage device), should not be construed as a limitation. Other types of commercially available data storage systems, as well as processors and hardware controlling access to these particular devices, may also be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be destaged from cache to the physical storage device, such as by a DA.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices, logical volumes or logical units (LUNs). The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Figure 2B:
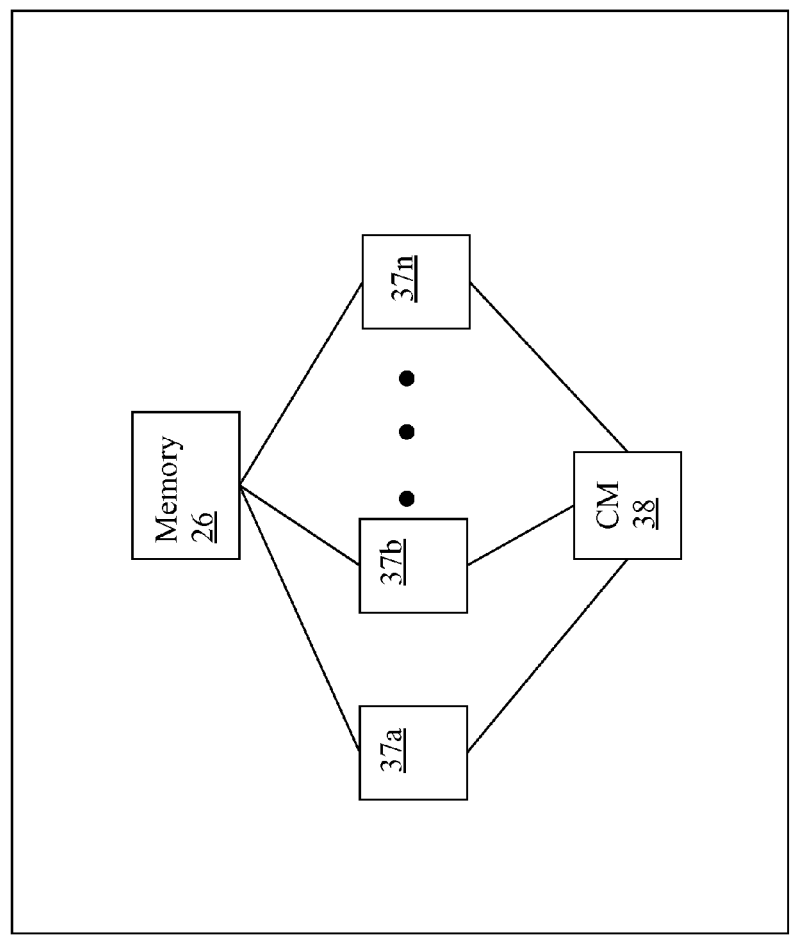
FIG. 2B is a representation of the logical internal communications between the directors and memory included in one embodiment of the data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host may also have one or more additional mapping layers so that, for example, a host side logical device or volume is mapped to one or more data storage system logical devices as presented to the host.

Figure 3:
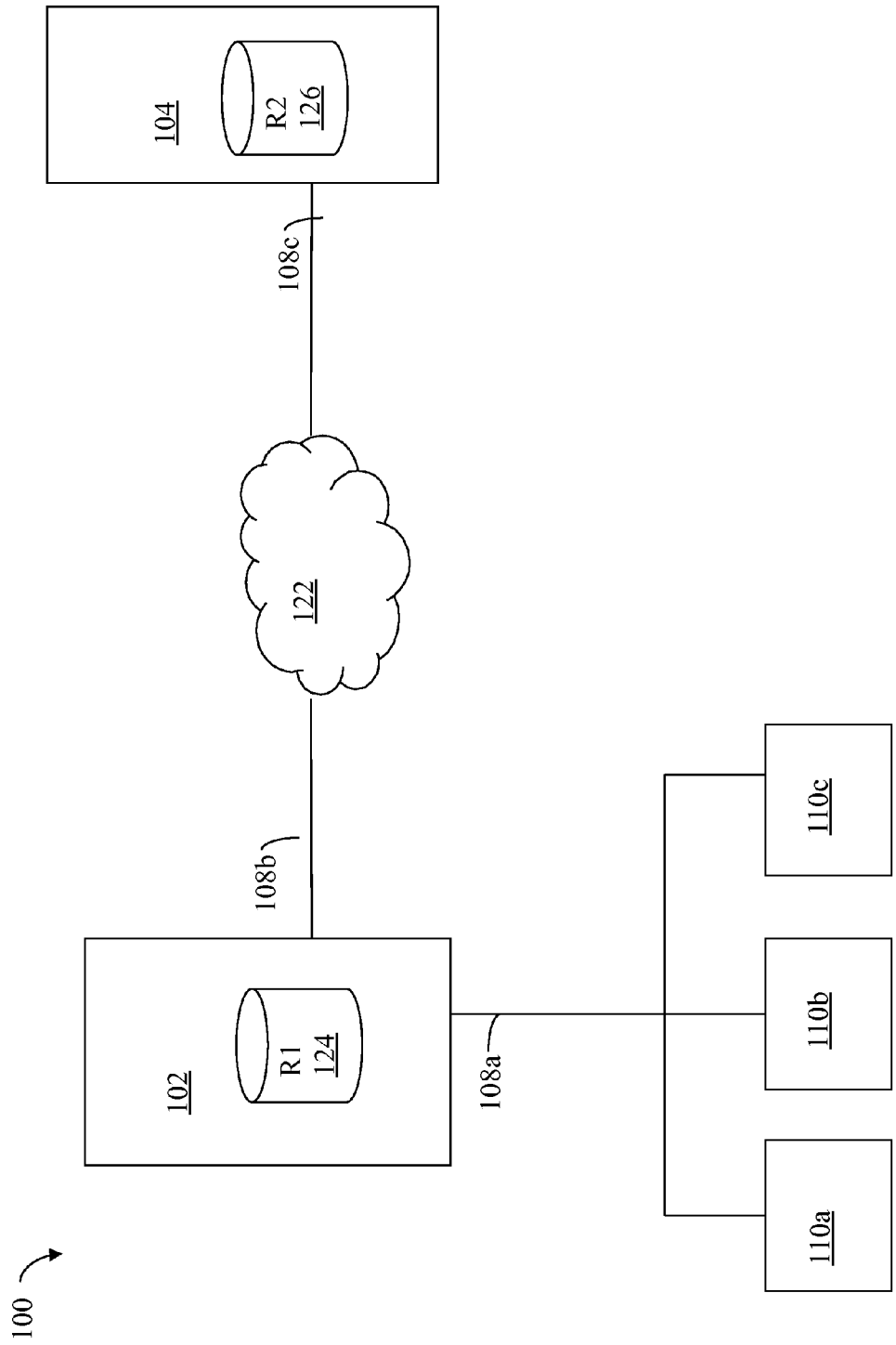
FIGS. 3 and 4 are example representations of components of a system that may be used in connection with the techniques herein.

Referring to FIG. 3, shown is an example of an embodiment of a system 100 that may be used in connection with the techniques described herein. It should be noted that the embodiment illustrated in FIG. 3 presents a simplified view of some of the components illustrated in FIGS. 1 and 2A, for example, including only some detail of the data storage systems 20a through 20n for the sake of illustration.

Included in the system 100 are data storage systems 102 and 104 and hosts 110a, 110b and 110c. The data storage systems 102, 104 may be remotely connected and communicate over network 122, such as the Internet or other private network, and facilitate communications with the components connected thereto. Hosts 110a, 110b and 110c may perform operations to data storage system 102 over connection 108a. The hosts 110a, 110b and 110c may be connected to the data storage system 102 through connection 108a which may be, for example, network or other type of communication connection. Although not illustrated, the hosts 110a-110c may also be directly connected to a network such as the Internet.

The data storage systems 102 and 104 may include one or more devices. In this example, data storage system 102 includes device R1 124 and data storage system 104 includes device R2 126. Both of the data storage systems may include one or more other logical and/or physical devices. Data storage system 102 may be characterized as local with respect to hosts 110a, 110b and 110c. Data storage system 104 may be characterized as remote with respect to hosts 110a, 110b and 110c. For example, in some embodiments in accordance with techniques herein, the distance between the data storage systems 102 and 104 may be 200 km or more.

The host 110a may issue a command, such as to write data to device R1 of data storage system 102. In some instances, it may be desirable to copy data from the storage device R1 to another second storage device, such as R2, provided in a different location so that if a disaster occurs that renders R1 inoperable, the host (or another host) may resume operation using the data of R2. Such a capability is provided, for example, by the SRDF® products provided by EMC Corporation of Hopkinton, Mass. Data storage device communication between Symmetrix™ data storage systems using SRDF® is described, for example, in U.S. Pat. Nos. 5,742, 792, 5,544,347, and 7,054,883, all of which are incorporated by reference herein. With SRDF®, a user may denote a first storage device, such as R1, as a master storage device and a second storage device, such as R2, as a slave storage device. Other incarnations of SRDF® may provide a peer to peer relationship between the local and remote storage devices. In this example, the host 110a interacts directly with the device R1 of data storage system 102, but any data changes made are automatically provided to the R2 device of data storage system 104 using SRDF®. In operation, the host 110a may read and write data using the R1 volume in 102, and SRDF® may handle the automatic copying and updating of data from R1 to R2 in data storage system 104.

As illustrated in connection with other figures herein, data storage system 102 may have one or more RAs included therein to facilitate remote connections to the data storage system 104. Communications between storage system 102 and 104 may be made over connections 108b,108c to network 122. Data storage system 104 may include one or more RAs for use in receiving the communications from the data storage system 102. The data storage systems may communicate, for example, over Gigabit Ethernet connections supporting TCP/IP traffic. The SRDF® replication functionality may be facilitated with the RAs provided at each of the data storage systems 102 and 104. Performing remote data communications using SRDF® over a TCP/IP network is described in more detail in U.S. Pat. No. 6,968,369, Nov. 22, 2005, Veprinsky, et al., REMOTE DATA FACILITY OVER AN IP NETWORK, which is incorporated by reference herein. In connection with SRDF®, a single RDF link or path may be between an RA of the system 102 and an RA of the system 104. As described in more detail below, techniques are described for use in transmitting data over an RDF link, such as I/O traffic including write data in connection with performing remote data replication over the RDF link between the systems 102 and 104.

An embodiment may also include the concept of a remote data facility (RDF) group in which one or more devices on a data storage system are associated with a particular group under the control of a single RA which services the devices included therein. Rather than have a single R1 device and a single R2 device, a grouping may be defined so that a source group of devices, such as on data storage system 102, have corresponding target devices of a target group, such as devices on data storage system 104. Devices in a source group may be mirrored in corresponding devices of a target group using SRDF® functionality.

Techniques herein may be used with SRDF®, or more generally any RDF, operating in one or more different supported modes. For example, such modes may include SRDF® operating in synchronous mode, asynchronous mode, or adaptive copy mode. For example, in connection with SRDF®, the host may issue a write to an R1 device in a first data storage system and the data change is propagated to the R2 device in a second data storage system. As discussed in U.S. Pat. No. 5,544,347, SRDF® can be operated in either a synchronous mode or an asynchronous mode. When operating in the synchronous mode, the host does not consider an operation specified by a command chain to be completed until the command chain has been committed to both the first and second data storage systems. Thus, in synchronous mode, the first or source storage system will not provide an indication to the host that the data operation is complete until the first storage system receives an acknowledgement from the second data storage system regarding the data for the R2 device. In contrast, in connection with the asynchronous mode, the host receives an acknowledgement from the first data storage system as soon as the information is committed to the first data storage system without waiting for an acknowledgement from the second data storage system. With synchronous SRDF®, a host cannot proceed to the next I/O until a synchronous SRDF® I/O has completed.

Depending on the physical distance between the data storage systems 102, 104, it may be desirable to operate in a mode such as asynchronous to avoid host timeouts while the host awaits acknowledgement regarding completion of a host I/O.

Described in following paragraphs are techniques that may be used in connection with performing data replication in an asynchronous manner such as SRDF® operating in an asynchronous mode (SRDF®/A). With asynchronous mode remote data replication, a consistent point in time image is provided on the target R2 device that is only slightly behind (in terms of writes performed) the source R1 device. With asynchronous data replication such as with SRDF®/A, changes or writes to the first device or group of devices are collected for each occurrence of a time period, such as every X seconds, and then transferred to the R2 system to be applied to the second R2 device or group of devices. Although the remote R2 copy of the data will never be as current as the primary R1 copy, this method can replicate data over considerable distances and with reduced bandwidth requirements and minimal impact on host performance.

Each time period (e.g., X seconds, X>0) for which writes are collected or captured may also be referred to as a cycle or delta set having an associated cycle or sequence number. Thus, writes directed to an R1 device may be collected for cycle 1, cycle 2, and the like, whereby the sequence or cycle number denotes the particular time period in a sequence of successive time periods for which writes are collected. In an embodiment in accordance with techniques herein, dependent write consistency may be provided by processing and preserving all writes to the destination R2 system in ordered sequential numbered sets. In this manner, the writes of each cycle may be applied in a sequential ordering to the R2 device based on the cycle or sequence number associated with each cycle of writes. Dependent write consistency refers to the maintenance of consistent replica data between the R1 source device and R2 destination device.

In one embodiment, writes collected within the same single cycle (e.g., writes having the same sequence or cycle number) may be applied in any order to the R2 device whereby such writes may be characterized as being write order independent. As writes during a time period or cycle are recorded, additional processing may be performed to obtain a final set of write operations actually transmitted from the R1 to the R2 data storage system whereby such writes in the final set are write order independent. For example, write folding may be performed for writes in a single capture cycle whereby if a single portion of data is updated multiple times, only the final or most recent data update is actually included in the final set transmitted to the R2 system. Since consistency is maintained between cycles, if replication stops, processing is performed to ensure that either a fully received cycle of write data is applied to the R2 device, or is otherwise discarded.

In one embodiment, a write may be included in a particular cycle if processing of the write operation has commenced within the time period of that particular cycle.

For each collection or cycle N of write data directed to the R1 device having an associated sequence number, processing may include a data collection or capture phase, a transmit or transmission phase, a receive phase and a restore or apply phase. Generally, writes are collected for a time period or a particular cycle in a capture phase on the R1 system, SRDF®/A transfers a cycle of data in the transmit phase from the R1 system to the R2 system, the receive phase on the R2 system receives data from the transmit phase, and the apply or restore phase with respect to a particular cycle refers to applying the cycle of data to the R2 device.

Figure 4:
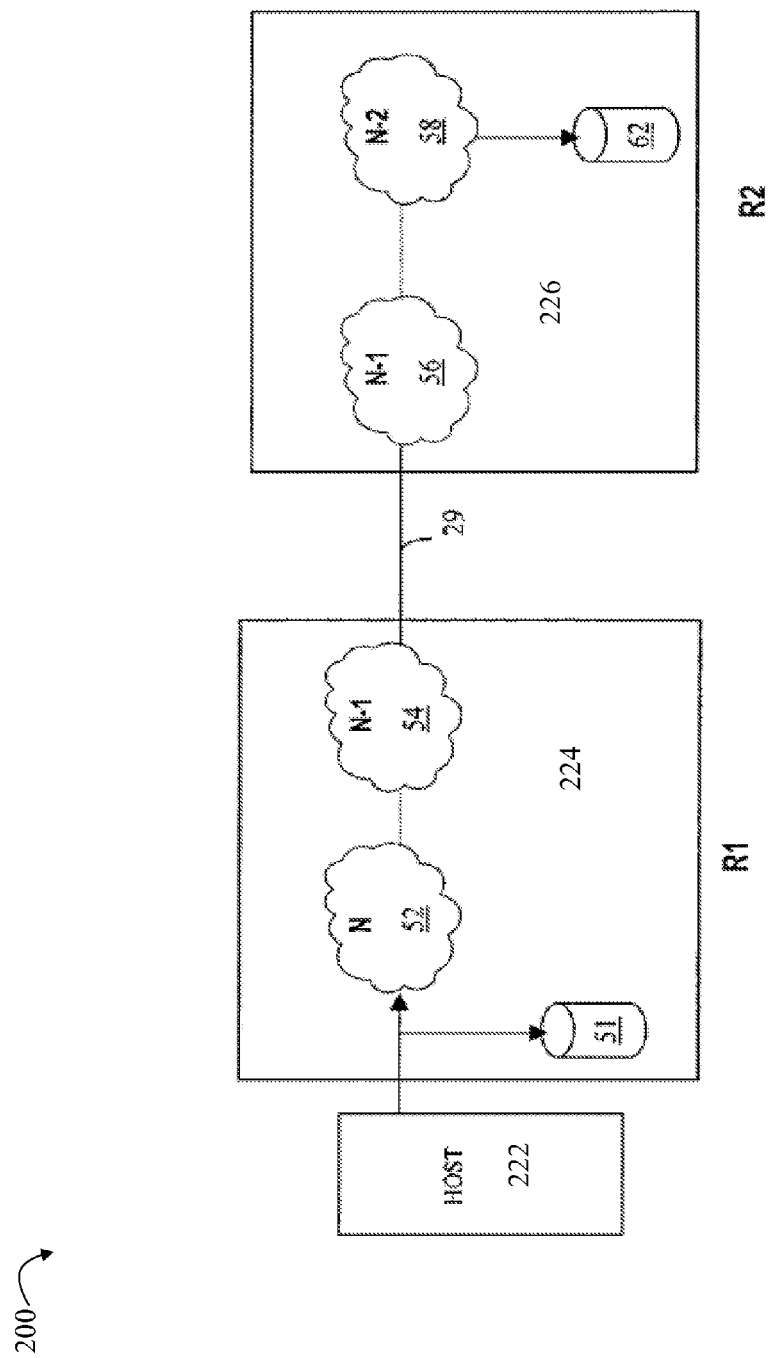

Referring to FIG. 4, a path of data is illustrated from the host 222 to the local R1 storage system 224 and the remote R2 storage system 226. Data written from the host 22 to the local storage system 225 is stored locally, as illustrated by the storage device 51. The data that is written by the host 222 to the local storage system 224 is also maintained by the local storage system 224 in connection with being sent by the local storage system 224 to the remote storage system 226 via the link 29.

In FIG. 4, the writes by the host 222 collected or captured for cycle N are shown as being assigned sequence number N, where N may be greater than zero in a system where the first cycle is denoted by 1. All of the writes performed by the host 22 that are assigned sequence number N are collected in a single chunk of data 52. The chunk 52 represents a plurality of separate writes by the host 22 that occur during a single collection cycle or time period.

Generally, the local storage system 224 accumulates writes of one sequence number or chunk while transmitting a previously accumulated chunk (having the previous sequence number) to the remote storage system 226. Thus, while the local storage system 224 is accumulating writes from the host 222 that are assigned sequence number N, the writes that occurred for the previous sequence number (N-1) are transmitted by the local storage system 224 to the remote storage system 226 via the link 29. A chunk 54 represents writes from the host 22 that were assigned the sequence number N-1 that have not been transmitted yet to the remote storage system 226.

The remote storage system 226 receives the data from the chunk 54 corresponding to writes assigned a sequence number N-1 and constructs a new chunk 56 of host writes having sequence number N-1. The data may be transmitted using appropriate RDF protocol that acknowledges data sent across the link 29. When the remote storage system 226 has received all of the data from the chunk 54, the local storage system 224 sends a commit message to the remote storage system 226 to commit all the data assigned the N-1 sequence number corresponding to the chunk 56. Thus, sending the commit message by the R1 system to the R2 system indicates that all data of the cycle, such as cycle N-1, being transmitted has completed. Generally, once a chunk corresponding to a particular sequence number is committed, that chunk may be written to the logical storage device. This is illustrated in FIG. 4 with a chunk 58 corresponding to writes assigned sequence number N-2 (i.e., two before the current sequence number being used in connection with writes by the host 222 to the local storage system 26). In FIG. 4, the chunk 58 is shown as being written to a storage device 62 representing disk storage for the remote R2 device logically paired with R1 device 51 whereby processing is performed to replicate data of R1 device 51 on R2 device 62. Thus, the remote R2 storage system 226 is receiving and accumulating the chunk 56 corresponding to sequence number N-1 while the chunk 58 corresponding to the previous sequence number (N-2) is being written to disk storage 62 of the remote storage system 226. In some embodiments, the data for the chunk 58 is marked for write (but not necessarily written immediately to the physical storage medium or storage device), while the data for the chunk 56 is not (e.g. may be stored in cache or other memory buffer).

Thus, in operation, the host 22 writes data to the local storage system 224 that is stored locally in the R2 device 51 and is accumulated in the chunk 52. Once all of the data for a particular sequence number has been accumulated (described elsewhere herein), the local storage system 224 increments the sequence number. Data from the chunk 54 corresponding to one less than the current sequence number is transferred from the local storage system 224 to the remote storage system 226 via the link 29. The chunk 58 corresponds to data for a sequence number that was committed by the local storage system 224 sending a message to the remote storage system 226. Data from the chunk 58 is written to the R2 storage device 62.

Note that the writes within a particular one of the chunks 52, 54, 56, 58 are not necessarily ordered. However, as described in more detail elsewhere herein, every write for the chunk 58 corresponding to sequence number N-2 was begun prior to beginning any of the writes for the chunks 54, 56 corresponding to sequence number N-1. In addition, every write for the chunks 54, 56 corresponding to sequence number N-1 was begun prior to beginning any of the writes for the chunk 52 corresponding to sequence number N. Thus, in the event of a communication failure between the local storage device 24 and the remote storage device 26, the remote storage device 26 may simply finish writing the last committed chunk of data (the chunk 58 in the example of FIG. 4) and can be assured that the state of the data at the remote storage system 226 is ordered in the sense that the storage device 62 contains all of the writes that were begun prior to a certain point in time and contains no writes that were begun after that point in time. Thus, the R2 device, such as represented by element 62, always contains a point in time copy of R1 and it is possible to reestablish a consistent image from the R2 device.

In existing systems not using techniques herein and with reference to FIG. 4, processing may be performed where the transmission of writes for cycle N does not begin until the following occurs: cycle N-1 finishes transferring data and such data is fully received at the R2 data storage system and also the R2 system has completed applying cycle N-2 writes to the R2 device. Thus, while capture is performed for writes of cycle N (e.g., element 52), the transmit phase (e.g., element 54) and receive phase (e.g., element 56) may be performed with respect to writes of cycle N-1 and the restore or apply phase (e.g., element 58) may be performed with respect to writes of cycle N-2. In such a system, the R1 system may send a commit message to the R2 system when R1 has completed transmitting all the cycle N-1 write data. The R2 system may send an acknowledgement regarding cycle N-1 to the R1 system when all the cycle N-1 write data has been received at R2 and when R2 has also completed applying write of cycle N-2 to the R2 device. In such a system not using techniques herein, the R1 data storage system 224 does not start sending data for cycle N until such acknowledgement for cycle N-1 has been received at the R1 system 224 from the R2 system 226. Once the acknowledgement for cycle N-1 is received, the R1 system may perform a cycle switch to cycle N and start sending writes for cycle N. During the time while the R1 system 224 is waiting to receive the acknowledgement for cycle N-1, the RDF link 29 may be underutilized since no data is currently being transmitted over link 29.

To further illustrate, consider the foregoing that illustrates processing as may be performing using existing asynchronous data replication techniques such as, for example, using the SRDF®/A product, without techniques herein with respect to writes directed to an R1 device of a primary or R1 data storage system where the R2 device is logically paired for data replication with an R2 device on the secondary or remote R2 data storage system.

Figure 5:
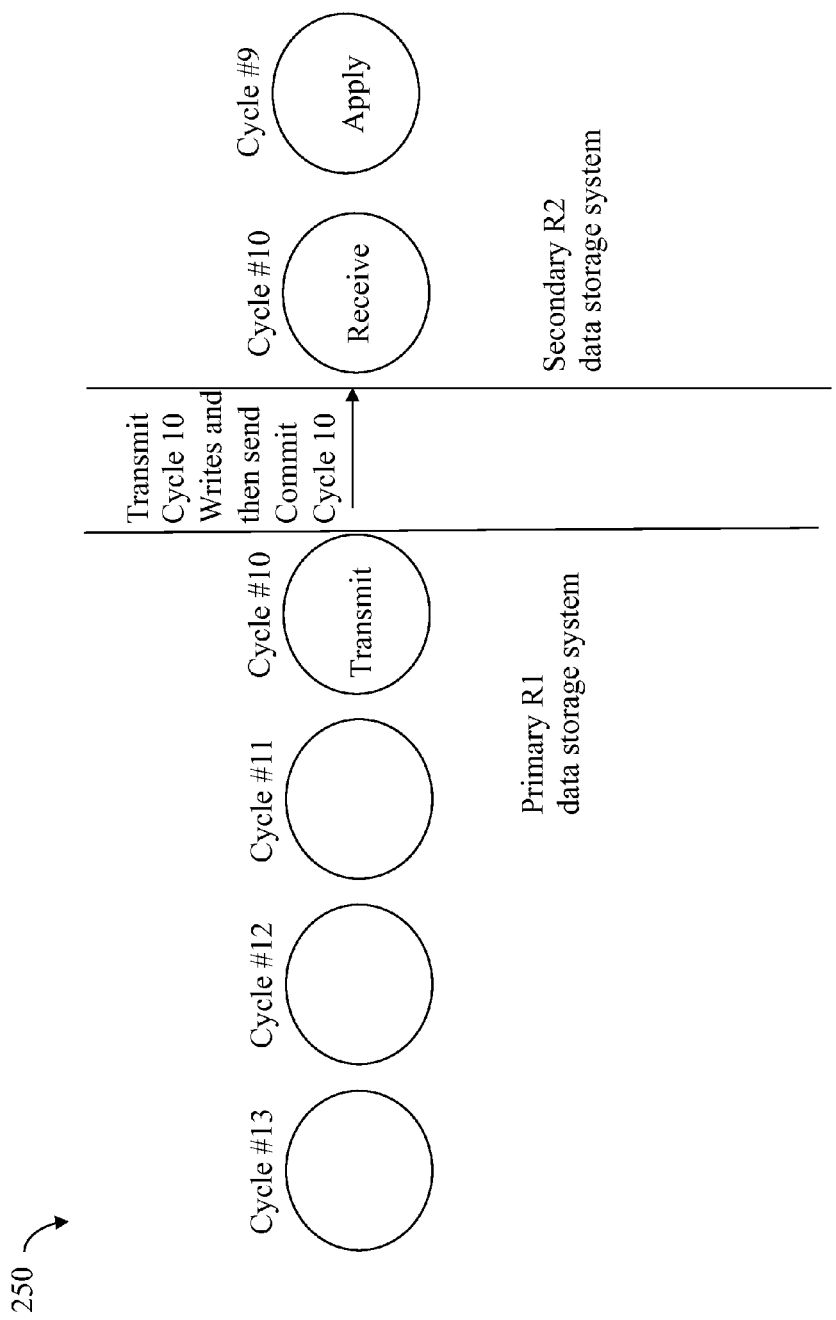
FIGS. 5-7 illustrate states of a system at different points in time in connection with a system not using techniques herein.

With reference to FIG. 5, shown is an example 250 in which the R1 primary data storage system may have collected data for cycles #10-13 (Currently collecting data for cycle 14 not shown), and cycle#10 (on primary R1 system) is in its transmit phase where R1 is in the process of transferring cycle #10 write data collected from the R1 to the R2 site. After cycle #10 data is transferred from R1 to R2, the R1 system sends a commit message to R2 to indicate that transfer of write data of cycle #10 is complete.

It should be noted that in connection with FIG. 5 and others herein, notation is used in which a circle with a cycle # denotes a cycle of writes collected for one instance of the defined time period, such as X seconds. For example, FIG. 5 illustrates that writes for cycle 10-13 have been collected on the R1 system, that cycle 10 is transmitted and then a commit message is sent subsequent to completing the transfer of cycle 10 writes, that cycle 10 writes are currently being received on the R2 system, and the cycle 9 writes are being applied to the R2 device.

At this first point in time, the current cycle state may be represented as illustrated in FIG. 5 where there is no data transmission of cycle write data such as over the RDF link between the R1 and R2 systems after the cycle 10 commit message is sent. In this case, R1 has completed the transmit phase for cycle #10, R2 has received all cycle #10 writes and R2 is currently applying cycle #9 writes locally to the R2 device.

Figure 6:
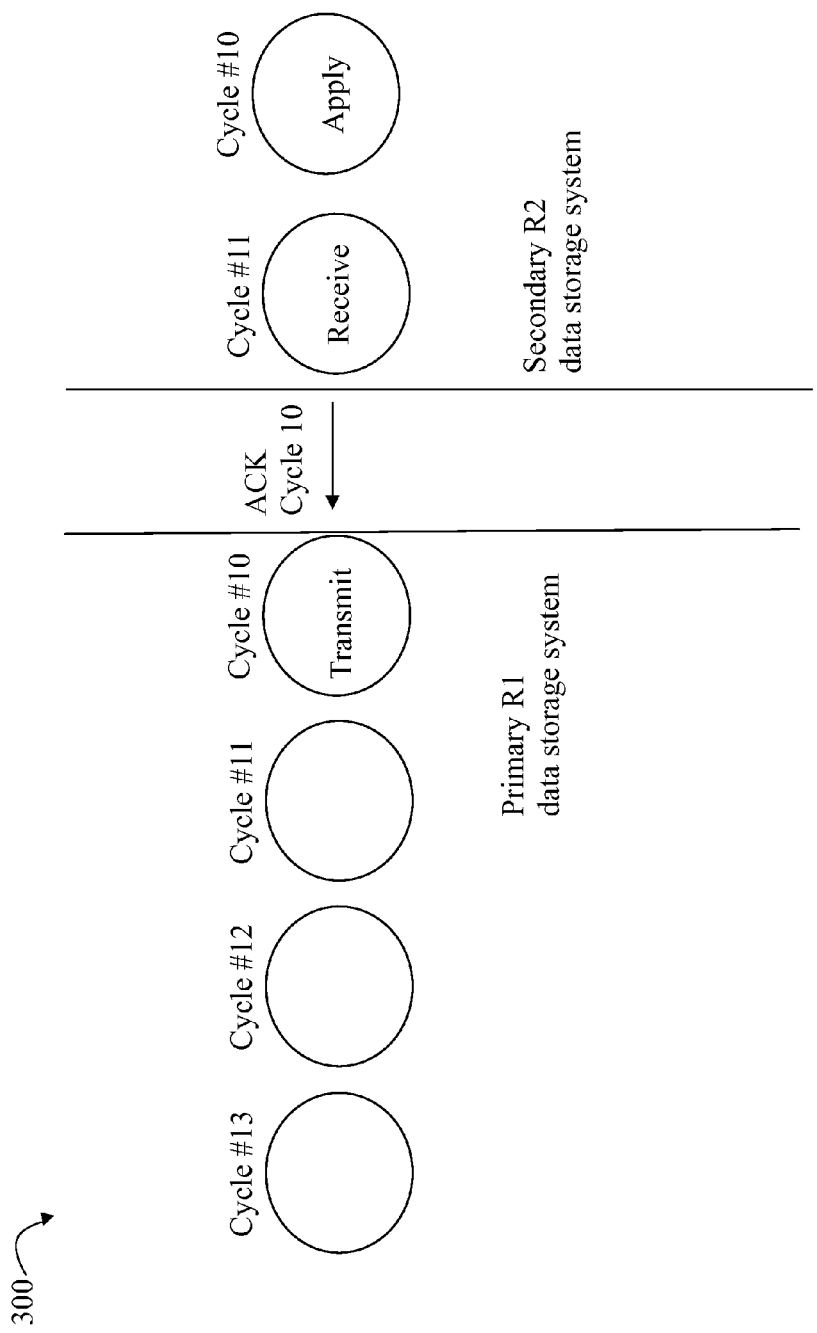

As illustrated in FIG. 6, once the secondary R2 system is done applying cycle #9 writes to the R2 device, R2 commences applying the cycle #10 data and the R2 system updates its current cycle state for expected awaiting data transmission to cycle #11. Once the R2 system is done applying cycle #9 data to the R2 device and has received all cycle #10 data, R2 also sends an acknowledgement regarding cycle #10 to the primary R1 system and, as then further illustrated in FIG. 7, the R1 system responds by permitting the cycle transmission switch on the R1 system to the next cycle #11.

In an embodiment not using techniques herein, until the R1 system receives the acknowledgement regarding cycle #10 from the R2 system indicating that cycle #10 data has been received and also indicating that cycle #9 data has been applied to the R2 device, the R1 system remains in cycle #10 transmission phase (e.g., switch to cycle #11 for transmission is pending) as shown in the example 300 of FIG. 6.

Only after primary R1 system receives the acknowledgement for cycle #10 (e.g., regarding cycle #9 data being applied to the R2 device and regarding all the cycle #10 data being received at R2) does R1 switch to cycle #11 for transmission and commence sending cycle #11 writes. After the R1 system updates its state and performs a cycle switch to cycle #11, the cycle state may be illustrated as in the example 350 of FIG. 7.

Figure 7:
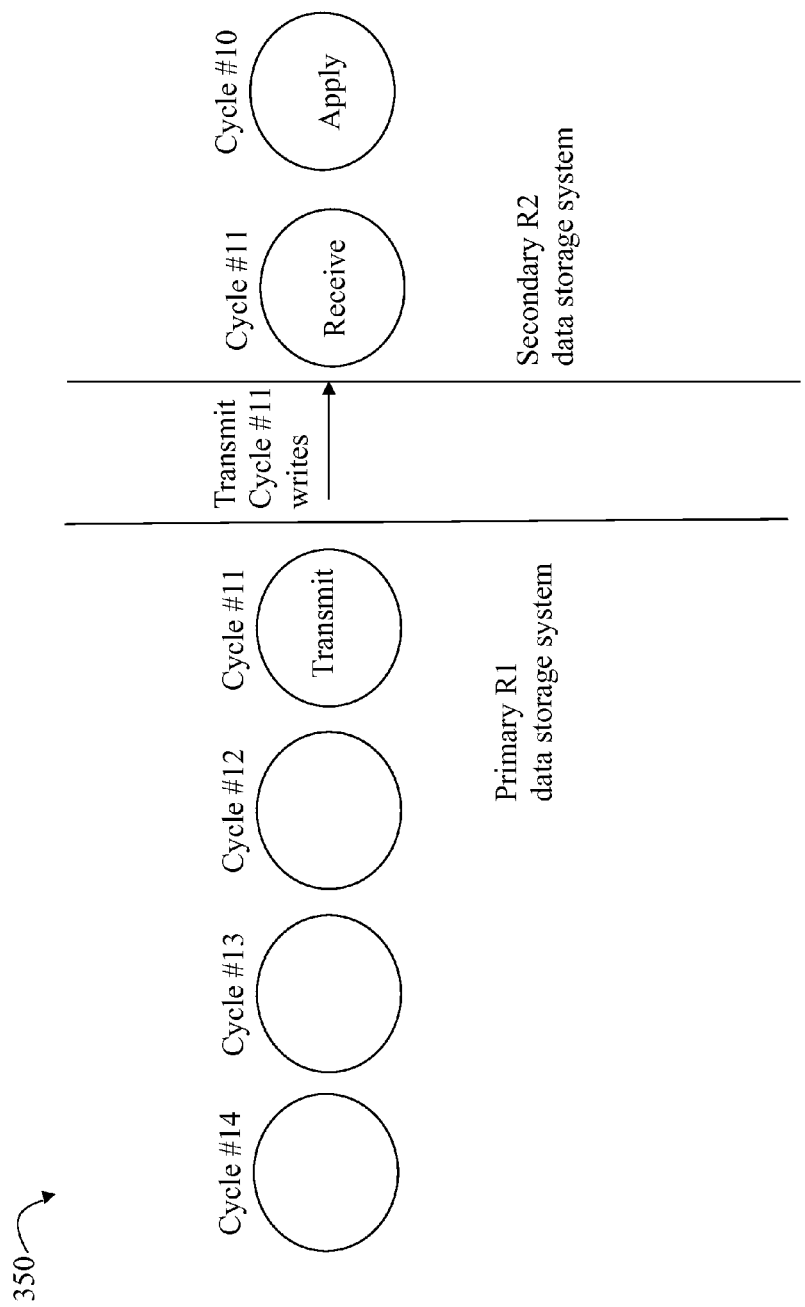

In connection with the foregoing of existing systems without using techniques herein, the primary R1 system does not send data from the next transmit phase of cycle #11 until it receives such acknowledgement from the R2 system that cycle #9 writes have been applied to the R2 device and that cycle #10 data has been completely received. During the time illustrated above while R1 waits for the acknowledgement from the R2 system regarding cycle #10 (e.g., such as in connection with illustration #1 and #2), no write data collected for cycle #11 in connection with data replication is transmitted from the primary R1 system to secondary R2 system and the network between R1 and R2 systems may be underutilized, for example, while waiting for cycle #9 data to be applied to the R2 device. Thus, while replication is in states as illustrated by FIGS. 5 and 6, the R1 data storage system may not send any data for new subsequent cycles (e,g, cycle #11) until the cycle transmission switch on R1 to the new cycle 11 as illustrated in FIG. 7.

As an improvement, an embodiment in accordance with techniques herein may perform an enhancement that enables the transfer of data from *future* transmit cycles (e.g., such as cycle #11) as soon as the *current* transmit cycle data (e.g., such as from cycle #10) has been transmitted by R1. Thus, in an embodiment in accordance with techniques herein, the R1 system may commence transmitting writes for cycle #11 as soon as it has completed transferring writes and sending the commit message for cycle #10 (e.g., without waiting for acknowledgement from the R2 system thereby indicating that cycle #10 writes have been received and cycle #9 writes have been applied to the R2 device).

The foregoing may be performed to improve network utilization such as for the network connecting R1 and R2 systems. With this improvement, R1 may start transmitting writes for cycle#11 at the point in time illustrated in connection with FIG. 5 rather than at the subsequent point in time as illustrated by FIG. 7 so that, for example, by the time cycle switch to cycle #11 occurs on R1 as illustrated in FIG. 7, the secondary R2 site may have already having received a large portion of the cycle #11 transmitted data.

What will now be described is a more detailed example illustrating performing asynchronous replication in an embodiment in accordance with techniques herein. Such techniques may be performed using components of a system such as described in connection with FIG. 4 as noted above.

Figure 8:
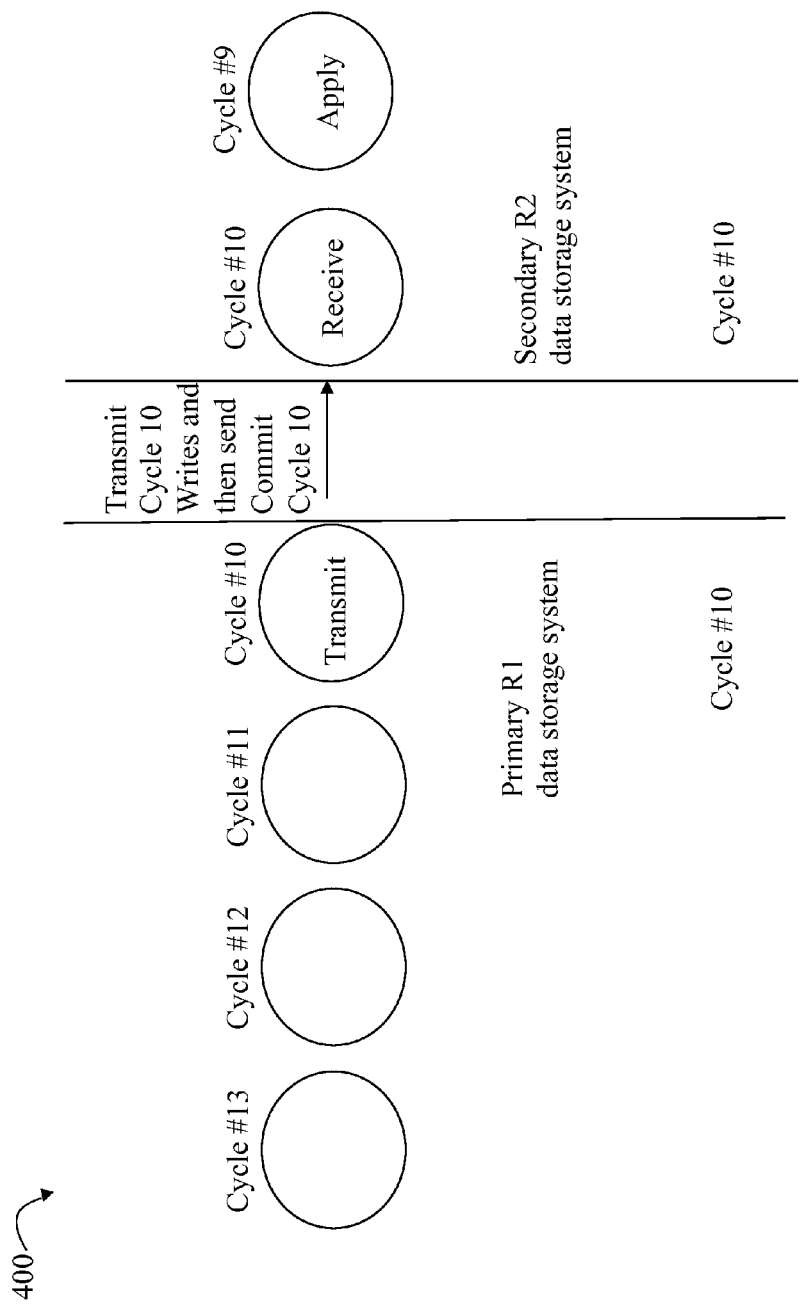
FIGS. 8-14 illustrate states of a system at different points in time in connection with an embodiment of a system using techniques herein.

Referring to FIG. 8, shown is an example representing the state of the system at a first point in time. The example of FIG. 8 may represent a state of the system at a first point in time such as described above in connection with FIG. 5. In the example 400, the R1 system has completed transmitting cycle 10 writes and sends a commit message regarding cycle 10 indicating that the R1 system has completed sending cycle 10 writes.

In the example 400, both the R1 and R2 systems having a current cycle or sequence number of 10. The current cycle of 10 on the R1 system indicates that the R1 system has not yet received an acknowledgement (ACK) regarding cycle 10 from the R2 system whereby such ACK regarding cycle 10 indicates that the R2 system has received all of cycle 10 writes from R1 and that R2 has also completed applying cycle 9 writes to the R2 device. The current cycle of 10 on the R2 system indicates that R2 has not yet sent the cycle 10 ACK to the R1 system.

In an embodiment in accordance with techniques herein, the R1 system may commence sending writes of cycle 11 immediately following completion of transmitting cycle 10 data and commit. As described elsewhere herein, the R1 system commences transmitting cycle 11 writes without waiting for the ACK regarding cycle 10 from the R2 system.

Figure 9:
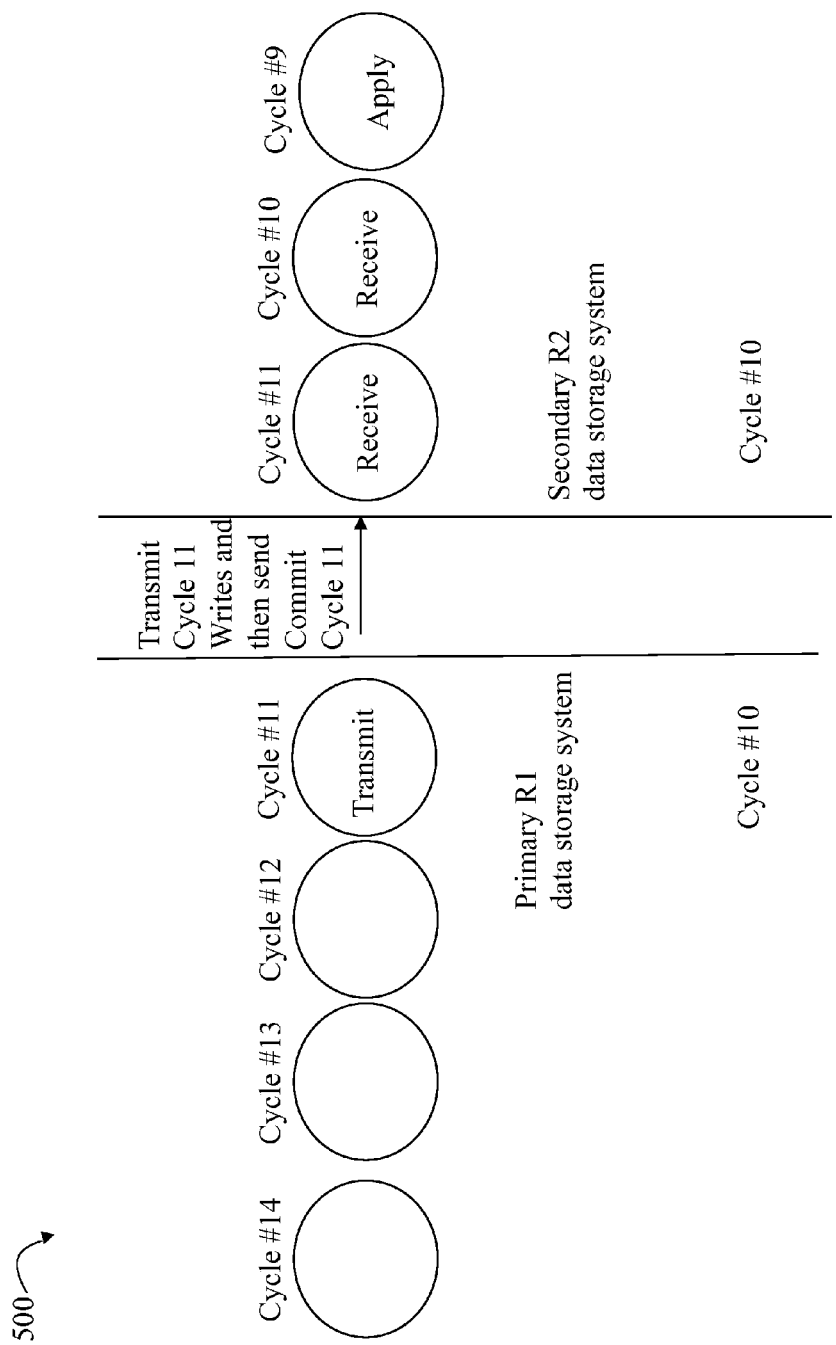

Referring to FIG. 9, shown is an example representing the state of the system at a second point in time subsequent to that of FIG. 8. In the example 500, the R2 system is still applying cycle 9 writes to the R2 device. The R1 system has transmitted cycle 11 writes, and then also transmitted a commit message regarding cycle 11 indicating that the R1 system has completed sending cycle 11 writes. Thus, the example 500 illustrates the pre-transfer of cycle 11 writes whereby the cycle number on the system R1 is 10 since the ACK regarding cycle 10 has not yet been received from the R2 system. FIG. 9 illustrates an example of a scenario where the current pre-transfer state is 1 cycle since the R1 system has a current cycle number of 10 and the current cycle of write data transmitted is 11.

In an embodiment in accordance with techniques herein, the R1 system may commence sending writes of cycle 12 immediately following completion of transmitting cycle 11 data and commit. As described elsewhere herein, the R1 system commences transmitting cycle 12 writes without waiting for the ACK regarding cycle 11 from the R2 system.

FIG. 9 illustrates that writes for cycles 11-14 have been collected on the R1 system (cycle 15 collection in progress but not illustrated), that cycle 11 writes are transmitted and then a commit message is sent subsequent to completing the transfer of cycle 11 writes, that cycle 10 and 11 writes have been received on the R2 system, and the cycle 9 writes are being applied to the R2 device.

Figure 10:
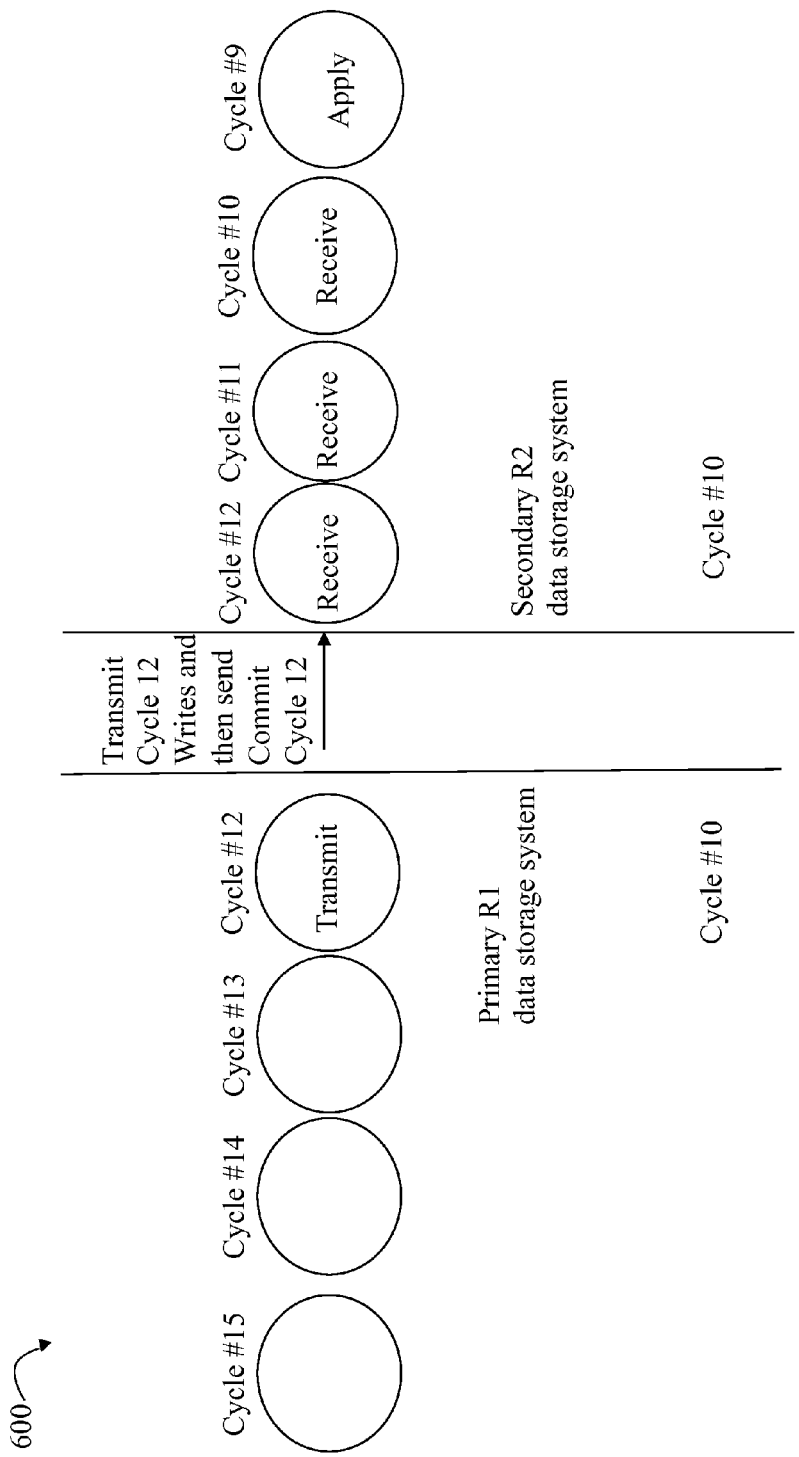

At a third point in time subsequent to that illustrated in FIG. 9, the R1 system commences transmission of cycle 12 writes as illustrated in FIG. 10 while the R2 system is still applying cycle 9 writes to the R2 device. Subsequent to completing the transfer of cycle 12 writes, the R1 system sends a commit message regarding cycle 12 indicating completion of transmission of cycle 12 writes.

The example 600 illustrates the pre-transfer of cycle 12 writes whereby the cycle number on the system R1 is 10 since the ACK regarding cycle 10 has not yet been received from the R2 system. FIG. 10 illustrates an example of a scenario where the current pre-transfer state is 2 cycles since the R1 system has a current cycle number of 10 and the current cycle of write data transmitted is 12.

FIG. 10 illustrates that writes for cycles 12-15 have been collected on the R1 system (cycle 16 collection in progress but not illustrated), that cycle 12 writes are transmitted and then a commit message is sent subsequent to completing the transfer of cycle 12 writes, that cycle 10, 11 and 12 writes have been received on the R2 system, and the cycle 9 writes are being applied to the R2 device.

Figure 11:
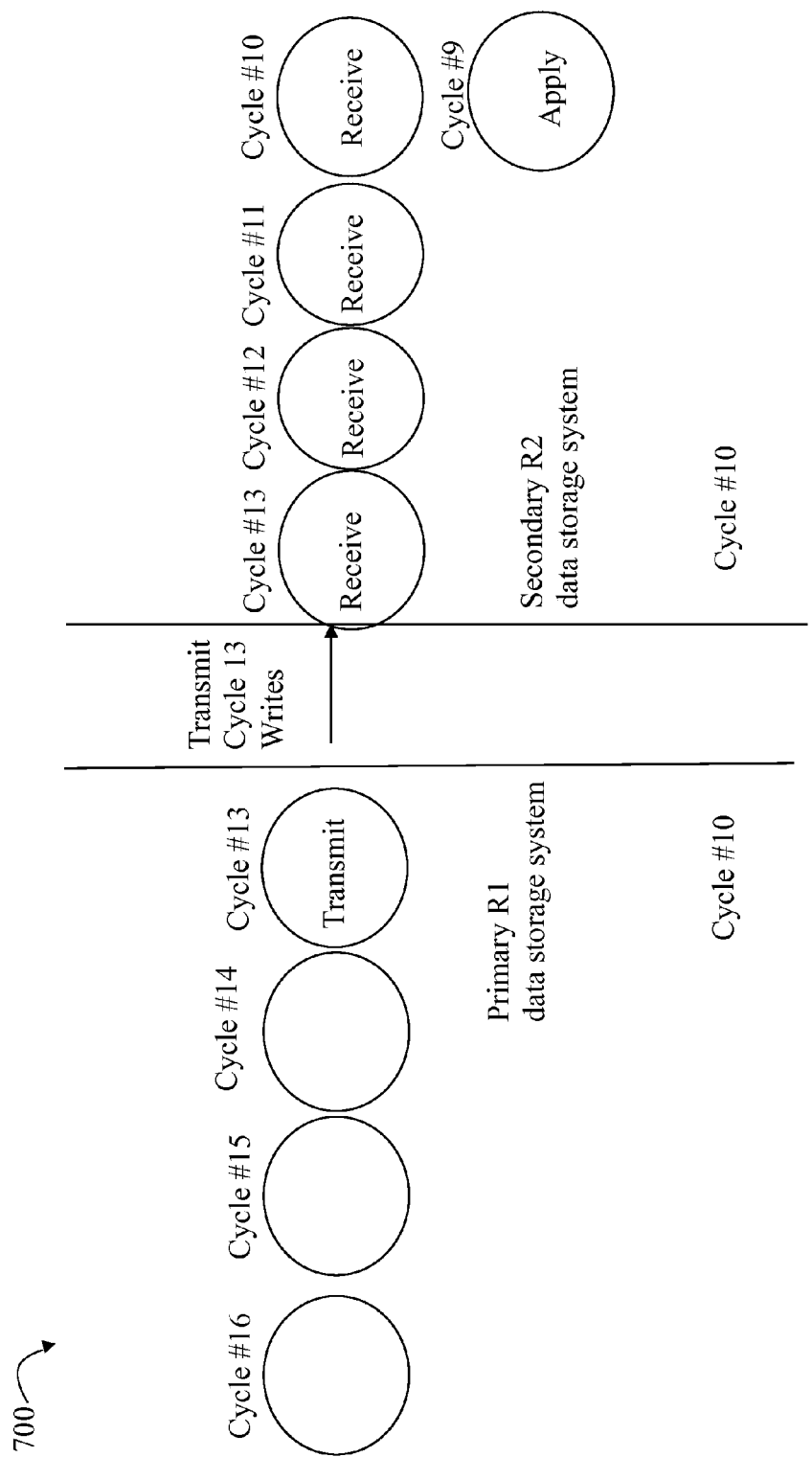

At a fourth point in time subsequent to that illustrated in FIG. 10, the R1 system commences transmission of cycle 13 writes as illustrated in FIG. 11 while the R2 system is still applying cycle 9 writes to the R2 device. The example 700 illustrates the pre-transfer of cycle 13 writes whereby the cycle number on the system R1 is 10 since the ACK regarding cycle 10 has not yet been received from the R2 system. FIG. 11 illustrates an example of a scenario where the current pre-transfer state is 3 cycles since the R1 system has a current cycle number of 10 and the current cycle of write data transmitted is 13.

FIG. 11 illustrates that writes for cycles 13-16 have been collected on the R1 system (cycle 17 collection in progress but not illustrated), that cycle 13 writes are being transmitted, that cycle 10, 11, 12 and 13 writes have been received on the R2 system, and the cycle 9 writes are being applied to the R2 device.

Figure 12:
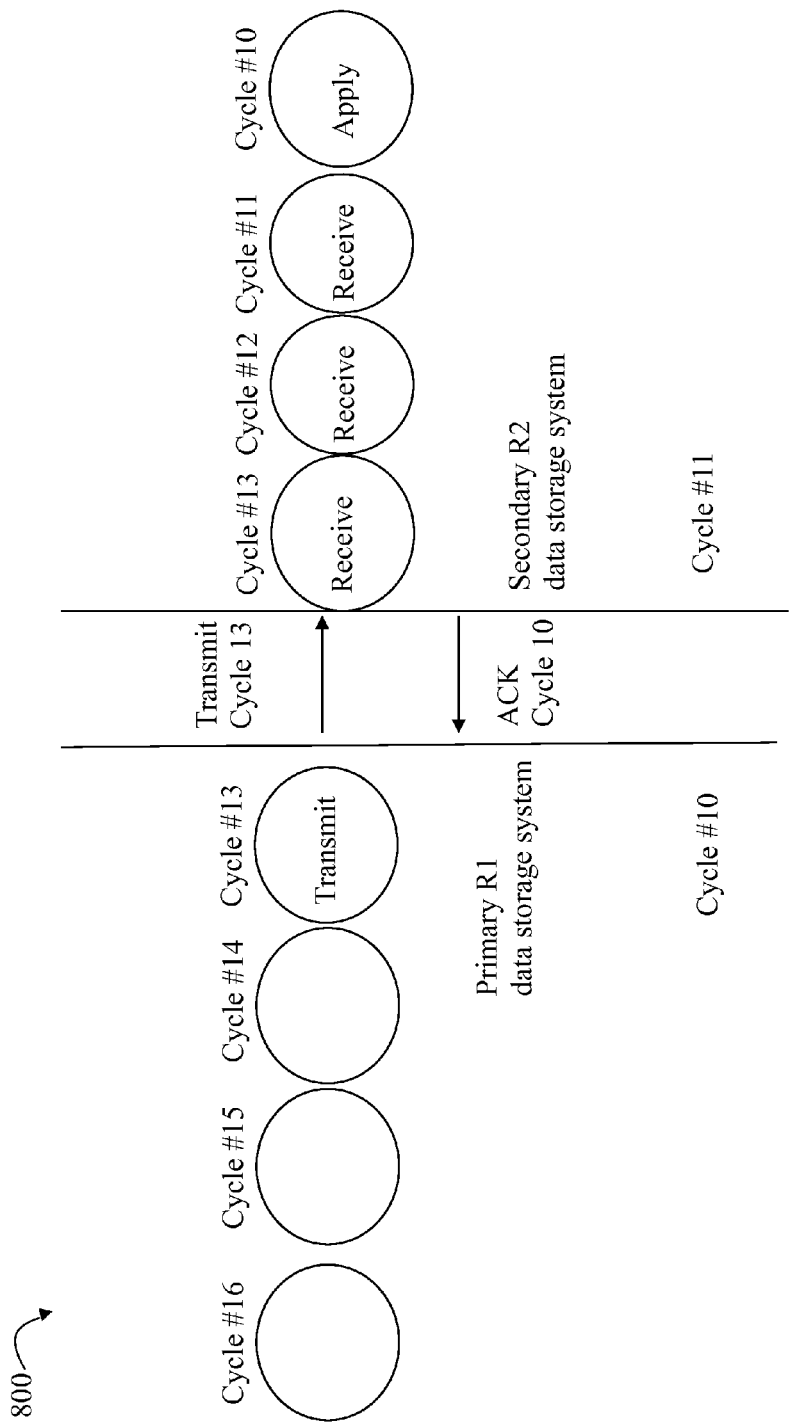

Referring to FIG. 12, shown is an example 800 illustrating a state of the system at a fifth point in time subsequent to that illustrated in FIG. 11. In the example 800, the R1 system is transmitting cycle 13 writes and the R2 system has completed applying cycle 9 writes to the R2 device of the R2 system. Additionally, all of cycle 10 writes have been received on the R2 system so that the R2 system sends an ACK regarding cycle 10 to the R1 system. The R2 system further commences applying cycle 10 writes to the R2 device and increments its current cycle to 11.

FIG. 12 illustrates that writes for cycles 13-16 have been collected on the R1 system (cycle 17 collection in progress but not illustrated), that cycle 13 writes are being transmitted, that cycle 11, 12 and 13 writes have been received on the R2 system, and the cycle 10 writes are being applied to the R2 device.

Figure 13:
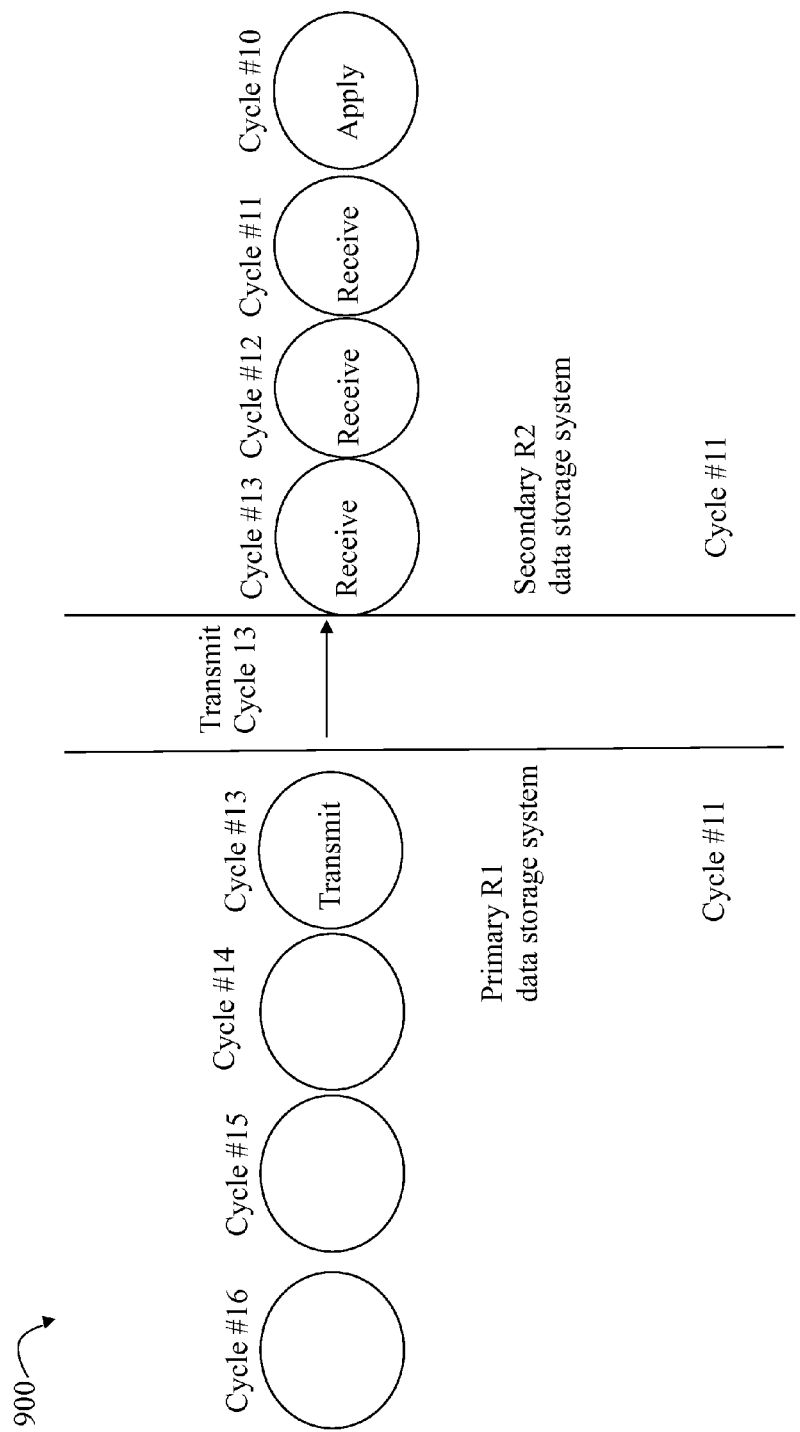

Referring to FIG. 13, shown is an example 900 illustrating a state of the system at a sixth point in time subsequent to that illustrated in FIG. 12. In the example 900, the R1 system receives the ACK regarding cycle 10 and increases its current cycle number to 11. The R2 system is still applying cycle 10 writes to the R2 device.

The example 900 illustrates the pre-transfer of cycle 13 writes whereby the cycle number on the system R1 is 11 since the ACK regarding cycle 11 has not yet been received from the R2 system. FIG. 13 illustrates an example of a scenario where the current pre-transfer state is 2 cycles since the R1 system has a current cycle number of 11 and the current cycle of write data transmitted is 13.

Figure 14:
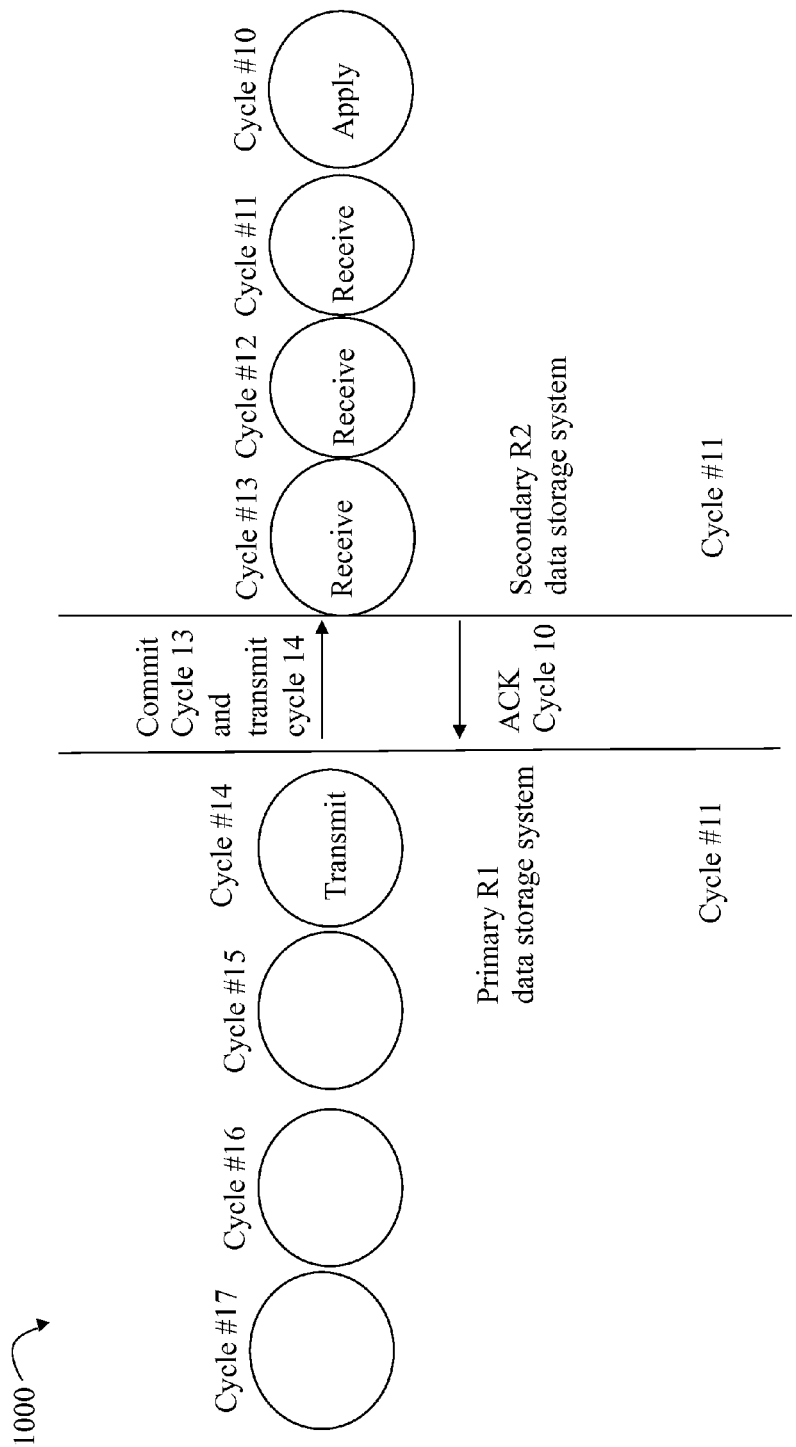

Referring to FIG. 14, shown is an example 1000 illustrating a state of the system at a seventh point in time subsequent to that illustrated in FIG. 13. In the example 1000, the R1 system sends a commit message regarding cycle 13 since it has completed sending cycle 13 writes and commences sending cycle 14 writes. The R2 system is still applying cycle 10 writes to the R2 device.

The example 1000 illustrates the pre-transfer of cycle 14 writes whereby the cycle number on the system R1 is 11 since the ACK regarding cycle 11 has not yet been received from the R2 system. FIG. 14 illustrates an example of a scenario where the current pre-transfer state is 3 cycles since the R1 system has a current cycle number of 11 and the current cycle of write data transmitted is 14.

FIG. 14 illustrates that writes for cycles 14-17 have been collected on the R1 system (cycle 18 collection in progress but not illustrated), that a commit message is sent subsequent to completing the transfer of cycle 13 writes, that cycle 14 writes are currently being transmitted, that cycle 11, 12 and 13 writes have been received on the R2 system, and the cycle 10 writes are being applied to the R2 device.

The foregoing FIGS. 8-14 illustrate examples of the state of the system at various points in time operating in accordance with techniques described herein which provide for pre-transfer of cycle data from the R1 to the R2 system.

In an embodiment in accordance with techniques herein, there may be multiple cycles of write data for which the R2 system has received less than the complete cycle of writes. For example with reference to FIG. 11, the R1 system may be currently transmitting cycle 13 writes and may have completed sending writes for cycles 11 and 12. However, the R2 system may not have received all writes for cycles 11, 12 and 13. Transmission of such write data for any one or more of cycles 11, 12 and 13 may not have been completely received by the R1 system. In other words, the write data for any cycle, once sent from the R1 system, may arrive at the R2 system in any order. However, the R2 system applies the cycles of write data in sequence in accordance with the associate cycle or sequence number. For example, cycle N+1 write data is applied after cycle N write data has been completely applied. The R2 system does not apply any write data from cycle N+1 until all write data from cycle N has been received and applied to the R2 device.

In connection with the foregoing, write data that is transferred from the R1 system to the R2 system may include an associated cycle number ID or tag identifying the particular cycle to which the write data belongs. In this manner, the R2 system may receive the write data for multiple cycles in any order and then use the cycle number ID or tag included in the received write data message to determine the correct cycle to which the received write data belongs.

It should be noted that the end of cycle commit state or operation (denoting that R1 has completed sending a particular cycle of writes) may generally include sending and/or exchanging one or more messages between the R1 and the R2 systems. In one embodiment, the metadata included in a message denoting the commit state regarding a particular cycle N may include sufficient information for the R2 system to be able to determine when it has received all the cycle N write data. For example, such metadata may denote one or more characteristics about the entire cycle N write data such as the total number of writes in the cycle N, the total amount or size of write data in the cycle, and the like. To further illustrate, the R1 system may have completed transmission of cycle N which includes only 10 writes and then the R1 system sends commit message for cycle N indicating that R1 has completed transmission of cycle N writes which includes 10 writes. The R1 system may commence sending cycle N+1 write data. The R2 system may have received 8 writes of cycle N and a portion of writes of cycle N+1. Additionally, the R2 system may also have received the cycle N commit message from the R1 system indicating that cycle N includes 10 writes. However, the R2 system has not yet received the remaining 2 writes of cycle N. In this manner, the R2 system may determine that it has not received all the cycle N writes.

In one embodiment, the techniques herein may be applied on a continuous basis without limiting the number of transfer cycles of data which are pre-transferred ahead of the current cycle number switching. Thus, as described herein, cycle number switching indicates that a particular cycle X of data has been received by R2 and that cycle X−1 data has been completely applied to the R2 data set. In this manner, applying techniques herein on a continuous basis means that there is no limit to the difference between the transmit cycle number of data being transmitted from R1 to R2 and the current cycle number. Such transmission of cycle data may be performed in a continuous manner such that once cycle N's data has been transmitted from R1 to R2, R1 may commence transmitting cycle N+1's data. In such a case, the cycle for which data is being transmitted by R1 is not restricted or limited by the current cycle number whose data is being applied to the R2 data set.

Alternatively, an embodiment may specify a limit of the number of cycles of data that are pre-transferred to R2. The limit may specify a maximum allowable difference or distance between the transmit cycle number of data currently being transmitted from R1 to R2 and the current cycle number. This limit affects how far ahead the transmit cycle is with respect to the current cycle number and limits the number of cycles of data that are required to be buffered on R2 whereby such buffered cycles of data have not yet been applied to the R2 data set and have been either partially or wholly received by R2. In this case, the pre-transfer limit may be set in one aspect to limit the number of pending cycles for which cycle data has been received by the R2 system that has not yet been applied to the R2 device.

Such a limit on the maximum allowable number of cycles for which pre-transfer of cycle data form R1 to R2 is performed may be based on resources available on the R1 and/or R2 systems such as to buffer and store write data collected on R1, data received and waiting to be applied to the R2 device, and the like.

For example, reference is made back to FIGS. 5-7 where there is no pre-transfer of cycle data and thus the pre-transfer limit is 0. In the example illustrated in FIGS. 5-7, the R1 system does not begin transmitting cycle 11 data until the R1 system has updated its cycle number to 11 (e.g., performed a cycle switch from 10 to 11) upon receiving the ACK regarding cycle 10 from the R2 system.

In connection with an embodiment in accordance with techniques herein, reference is made back to FIG. 9 where the current pre-transfer state illustrated is 1 since cycle 11 writes are being transmitted while the current cycle on the R1 system is 10. Assume that a pre-transfer limit of 1 is specified. In this case, the R1 system would not commence transmitting the cycle 12 data as in FIG. 10 since this would advance the current pre-transfer state to +2 and the pre-transfer limit is 1. Rather, the R1 system would wait until it receives the ACK regarding cycle 10 prior to commencing transmission of cycle 12 writes.

As a further illustration with a pre-transfer limit, assume that a pre-transfer limit of 3 is specified. In this case, processing may proceed as described and illustrated in connection with FIGS. 8-14 since the pre-transfer state does not exceed the limit of 3. For example, in connection with FIGS. 11 and 14, a pre-transfer of cycle data occurs for 3 cycles but does not exceed the pre-transfer limit of 3.

As with the general data storage system described elsewhere herein, a write operation may be processed by initially storing the write data in cache of the data storage system and marking the corresponding cache location as including write pending data. At a later point in time, the write data in the cache marked as write pending is destaged to physical storage whereby the write data is copied from cache to physical storage. On the R1 system, the write operation may be considered completed once the write data directed to the R1 device is stored in cache on the R1 system. In a similar manner, a write operation may be considered applied to an R2 device when the write data of the write operation is any of stored as write pending data in a cache of the second data storage system, and destaged to a location on a physical storage device provisioned for the R2 device.

Although techniques are described herein with respect to a single R1 device and a single R2 device, it should be noted that more generally, techniques herein may be applied to a group of R1 devices and group of R2 devices. For example, a cycle of data may be collected for a time period with respect to a group of R1 devices and techniques herein may be applied with respect to the group of R1 devices and group of R2 devices. Each device in the R1 group may be logically paired with a particular device in the R2 group for purposes of data replication. In this case, the logical relationship between a first device of the R1 group and a second device of the R2 group is that the techniques herein are used to perform continuous replication of the first device on the second device.

In such an embodiment where consistency is desired with respect to the entire group of R2 devices, techniques herein may be generally applied with respect to the entire group of R2 devices. For example, additional processing may be performed on the R2 system to track when all the write data for a particular cycle has been received for all R2 devices of the R2 group, track when a particular cycle of writes for all R2 devices of the R2 group have been applied, and the like. Such tracking may be used to coordinate when to commence applying a next cycle of writes to R2 devices of the R2 group. In a manner similar to that as described herein with respect to a single R1-R2 device pairing, write data of cycle N is not applied to any R2 device in the R2 group until all write data of cycle N−1 has been applied to all R2 devices in the R2 group. Such processing may also not apply the write data of cycle N to any R2 device of the R2 group until all cycle N write data for all R2 devices of the R2 group has been received by the R2 system. In such a manner, all write data of each cycle may be applied, or not, as a unit to all R2 device of the R2 group. Since consistency is maintained between cycles, if replication stops, processing is performed to ensure that either a fully received cycle of write data is applied to all R2 device in the R2 group, or is otherwise not applied to any R2 device of the R2 group.

In such an embodiment, the transmission of data for each R1-R2 device pairing may proceed as described elsewhere herein with the additional processing for tracking and coordinating when to commence applying a next cycle of writes to the R2 device group.

Figure 15:
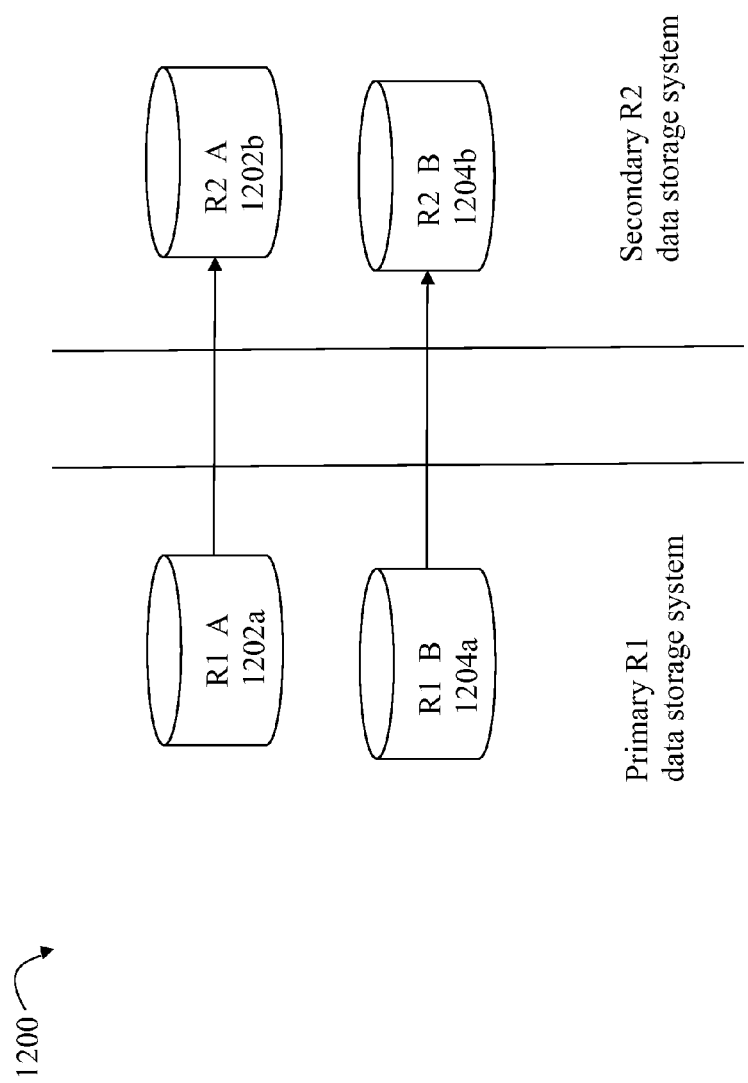
FIG. 15 illustrates an R1 device group and an R2 device group that may be used in an embodiment in accordance with techniques herein.

Referring to FIG. 15, shown is an example illustrating and R1 device group and an R2 device group that may be used in an embodiment in accordance with techniques herein. The example 1200 illustrates an R1 device group including device R1 A 1202*a* and R1 B 1204*a*, and illustrates an R2 device group include device R2 A 1202*b* and R2 B 1204*b*. A first logical device pairing is defined as R1 A 1202*a* and R2 A1202*b* whereby techniques as described herein may be performed to replicate data of device R1 A 1202*a* on device R2 A 1202*b*. A second logical device pairing is defined as R1 B 1204*a* and R2 B 1204*b* whereby techniques as described herein may be performed to replicate data of device R1 B 1204*a* on device R2 B 1204*b*. Processing as described herein may be performed to ensure write consistency among all devices R2 A 1202*b*, R2 B 1204*b* of the R2 device group whereby all such devices of the group have write applied up to the same cycle number.

Figure 16:
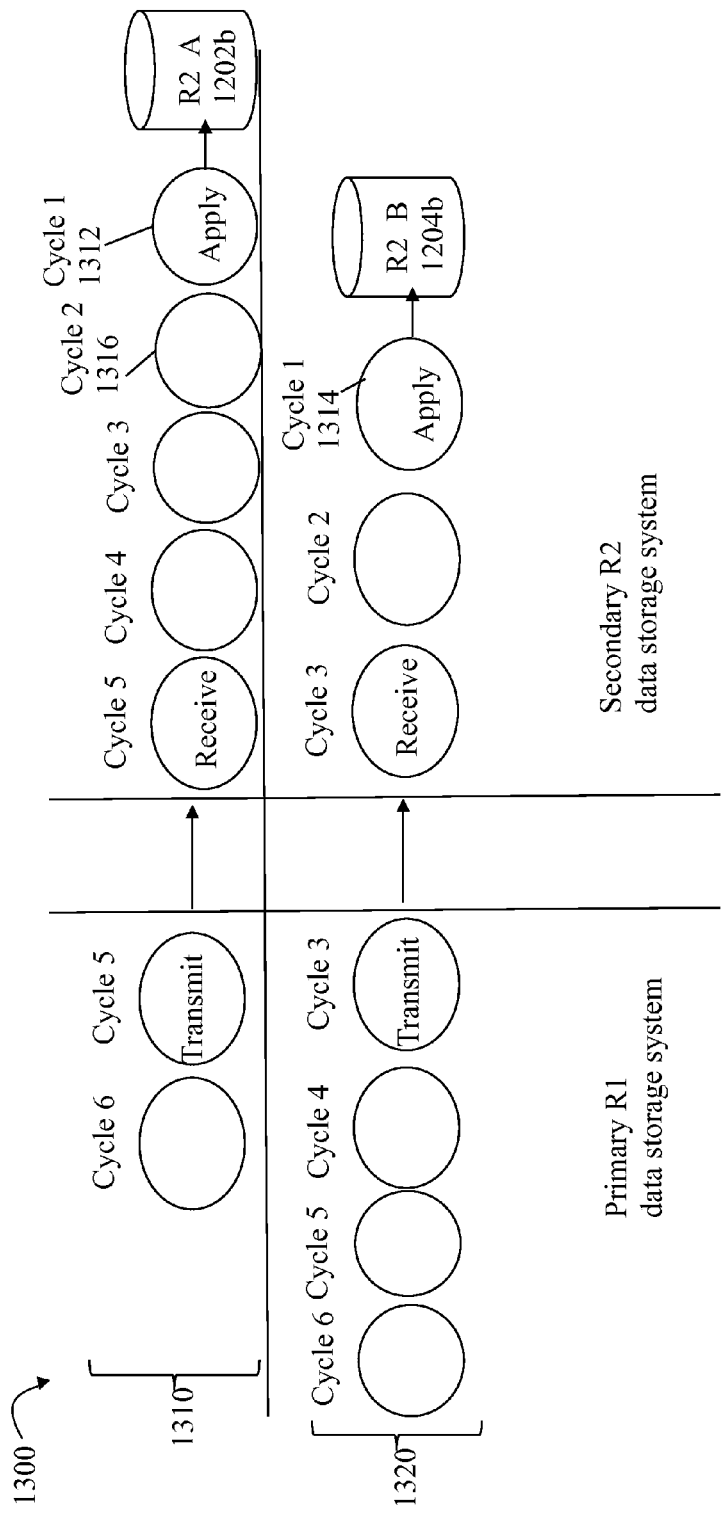
FIG. 16 illustrates a state of replication processing in an embodiment in accordance with techniques herein.

To further illustrate, reference is made to the example 1300 of FIG. 16. Element 1310 may represent the current state of replication processing for the first logical device pair R1 A 1202*a* and R2 A1202*b* (as illustrated in FIG. 15) and element 1320 may represent the current state of replication processing for the second logical device pair R1 B 1204*a* and R2 B 1204*b* (as illustrated in FIG. 15). In one embodiment, transmission of cycle data may proceed as described herein independently for each logical device pair.

Element 1310 indicates that for the first logical device pair, cycle 5 and cycle 6 writes have been collected on the R1 system, cycle 5 writes are currently being transmitted from the R1 to the R2 system, writes for cycles 2, 3, and 4 have been completely received on the R2 system, and cycle 1 writes are currently being applied to R2 A 1202*b*.

Element 1320 indicates that for the second logical device pair, writes for cycles 3, 4 and 5 have been collected on the R1 system, cycle 3 writes are currently being transmitted from the R1 to the R2 system, writes for cycle 2 has been completely received on the R2 system, and cycle 1 writes are currently being applied to R2 B 1204*b*. In this example, the cycle 1 writes 1312 as applied to R2 A 1202*b* may be completed and the cycle 1 writes 1314 as applied to R2 B 1204*b* may still be in progress. Thus, although the R2 system could begin applying cycle 2 writes 1316 to R2 A 1202*b* since the application of cycle 1 writes 1312 thereto has completed, such cycle 2 writes 1316 may not be applied in the illustrated embodiment in accordance with techniques herein until application of all cycle 1 writes 1314 to R2 B 1204*b* has also completed. In other words, all cycle 1 writes are applied to both R2 devices 1202*b*, 1204 prior to applying any write of cycle 2 to any R2 device 1202*b* 1204*b*.

Referring to FIG. 17, shown is a flowchart of processing steps that may be performed in an embodiment in accordance with techniques herein with an R1 group of R1 devices and an R2 group of R2 devices as described above.

The flowchart 1100 may be used to provide data consistency among the R2 group of R2 devices. At step 1102, X may be assigned a value of 1 denoting the first cycle of writes. X is a processing variable denoting that current cycle of writes for which processing is being performed to apply to the R2 group of R2 devices. At step 1104, a determination is made as to whether all cycle X writes have been received at the R2 system for al R2 devices in the R2 device group. It should be noted that a determination may be made that a particular cycle of writes has been received by the R2 system when the R2 system receives the commit message for that particular cycle from the R1 system as described elsewhere herein. Control remains at step 1104 until step 1104 evaluates to yes and then processing proceeds to step 1106. In step 1106, the cycle X writes are applied to all R2 device in the R2 group. At step 1108, a determination is made as to whether all cycle X writes have been applied. Control remains at step 1108 until step 1108 evaluates to yes and then processing proceeds to step 1110 where X is incremented by 1 to identify the next cycle of writes to be processed. From step 1110, control returns to step 1104.

It should be noted more generally, such techniques described herein may be performed to ensure data consistency among a single R2 device group including more than two R2 devices, and may be performed to ensure data consistency among multiple R2 device groups.

An embodiment may implement the techniques herein using code executed by a processor. For example, an embodiment may implement the techniques herein using code which is executed by a processor of the data storage system, or more generally any other system. As will be appreciated by those skilled in the art, the code may be stored on the data storage system on a computer-readable medium having any one of a variety of different forms including volatile and nonvolatile, removable and non-removable media implemented in any method or technology for storage of information such as computer readable instructions, data structures, program modules or other data. Computer-readable media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by a processor.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of performing data replication comprising:
receiving writes of cycle N that are directed to a first storage device of a first data storage system, N being an integer identifying a particular time period during which writes directed to the first storage device are received;
transmitting writes of cycle N−1 directed to the first storage device from the first data storage system to a second data storage system;
applying writes of cycle N−2 directed to the first storage device to a second storage device of the second data storage system;
determining when the writes of cycle N−1 directed to the first storage device have been received by the second data storage system and when the writes of cycle N−2 directed to the first storage device have been applied to the second storage device;

sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device; and transmitting at least some of the writes of cycle N directed to the first storage device from the first data storage system to the second data storage system prior to the first data storage system receiving the acknowledgement regarding cycle N−1, wherein there is no limit regarding a maximum allowable difference between a current transmit cycle number, for which writes are currently being transmitted from the first data storage system to the second data storage system, and a first cycle number for which the first data storage system is currently waiting to receive acknowledgement, from the second data storage system, indicating that the second data storage system has received writes of the first cycle number and applied writes of the first cycle number−1 to the second storage device whereby the current transmit cycle for which data is being transmitted from the first data storage system to the second data storage system is not restricted by the first cycle number.

2. The method of claim 1, wherein the first storage device and the second storage device are logical devices.

3. The method of claim 1, wherein no write from cycle N−1 directed to the first storage device is applied to the second storage device until all writes of cycle N−2 directed to the first storage device are applied to the second storage device.

4. The method of claim 3, wherein no write from cycle N directed to the first storage device is applied to the second storage device until all writes of cycle N−1 directed to the first storage device are applied to the second storage device.

5. The method of claim 1, further comprising:
performing an update of the first cycle number to N responsive to the first data storage system receiving the acknowledgement regarding cycle N−1, wherein transmitting at least some of the writes of cycle N that are directed to the first storage device to the second data storage system is performed prior to performing the update of the first cycle number to N.

6. The method of claim 5, wherein the current transmit cycle number denotes a cycle X of writes directed to the first storage device, wherein at least some of the writes of cycle X directed to the first storage device have been transmitted from the first data storage system to the second data storage system.

7. The method of claim 1, further comprising:
responsive to the first data storage system completing transmission of cycle N−1 writes directed to the first storage device, sending, from the first data storage system to the second data storage system, a commit message for cycle N−1 writes.

8. The method of claim 7, wherein the commit message includes information used by the second data storage system to determine whether all writes of cycle N−1 directed to the first storage device have been received.

9. The method of claim 8, wherein at least some of the writes of cycle N directed to the first storage device are received at the second data storage system prior to receiving all writes of cycle N−1 directed to the first storage device.

10. The method of claim 9, wherein no write of cycle N directed to the first storage device is applied to the second storage device prior to applying all writes of cycle N−1 directed to the first storage device.

11. The method of claim 1, further comprising:
sending first one or more messages from the first data storage system to the second data storage system, said first one or more messages including first one or more writes of cycle N−1 directed to the first storage device, wherein each of said first one or more messages includes an identifier denoting that the first one or more writes are included in cycle N−1; and
sending second one or more messages from the first data storage system to the second data storage system, said second one or more messages including second one or more writes of cycle N directed to the first storage device, wherein each of said second one or more messages includes an identifier denoting that the second one or more writes are included in cycle N.

12. The method of claim 1, wherein the second data storage system determines that writes of cycle N−1 directed to the first storage device have been applied to the second storage device when write data of each write included in cycle N−1 directed to the first storage device is any of: stored as write pending data in a cache of the second data storage system, and destaged to a location on a physical storage device provisioned for the second storage device.

13. A system comprising:
a first data storage system;
a second data storage system;
a first memory of the first data storage system comprising code, that when executed, performs first processing comprising:
receiving writes of cycle N that are directed to a first storage device of the first data storage system, N being an integer identifying a particular time period during which writes directed to the first storage device are received;
transmitting writes of cycle N−1 directed to the first storage device from the first data storage system to the second data storage system;
a second memory of the second data storage system comprising code, that when executed, performs second processing comprising:
applying writes of cycle N−2 directed to the first storage device to a second storage device of the second data storage system;
determining when the writes of cycle N−1 directed to the first storage device have been received by the second data storage system and when the writes of cycle N−2 directed to the first storage device have been applied to the second storage device;
sending, from the second data storage system to the first data storage system, an acknowledgement regarding cycle N−1 responsive to determining that the writes of cycle N−1 directed to the first storage device have been received by the second data storage system and that the writes of cycle N−2 directed to the first storage device have been applied to the second storage device; and
wherein the first processing further comprises:
transmitting at least some of the writes of cycle N directed to the first storage device from the first data storage system to the second data storage system prior to the first data storage system receiving the acknowledgement regarding cycle N−1, wherein there is no limit regarding a maximum allowable difference between a current transmit cycle number, for which writes are currently being transmitted from the first data storage system to the second data storage system, and a first cycle number for which the first data storage system is currently waiting to receive acknowledgement, from the second data storage system, indicating that the second data storage system has received writes of the first cycle number and applied writes of the first cycle number−1 to the second storage device whereby the current transmit cycle for which data is being transmitted from the first data storage system to the second data storage system is not restricted by the first cycle number.

14. A non-transitory computer readable medium comprising code stored thereon that, when executed, performs a method of performing data replication comprising:

receiving writes of cycle N that are directed to a first group of storage devices of a first data storage system, N being an integer identifying a particular time period during which writes directed to the first group of storage devices are received;

transmitting writes of cycle N−1 directed to the first group of storage devices from the first data storage system to a second data storage system;

applying writes of cycle N−2 directed to the first group of storage devices to a second group of storage devices of the second data storage system;

determining when the writes of cycle N−1 directed to the first group of storage devices have been received by the second data storage system and when the writes of cycle N−2 directed to the first group of storage devices have been applied to the second group of storage devices;

sending, from the second data storage system to the first data storage system for each storage device in the first group, an acknowledgement regarding cycle N−1 directed to each storage device of the first group responsive to determining that the writes of cycle N−1 directed to said each storage device of the first group have been received by the second data storage system and that the writes of cycle N−2 directed to said each storage device of the first group have been applied to a corresponding storage device of the second group of storage devices; and transmitting at least some of the writes of cycle N directed to a first storage device of the first group of storage devices from the first data storage system to the second data storage system prior to the first data storage system receiving the acknowledgement regarding cycle N−1 directed to the first storage device, wherein there is no limit regarding a maximum allowable difference between a current transmit cycle number, for which writes for the first storage device are currently being transmitted from the first data storage system to the second data storage system, and a first cycle number for which the first data storage system is currently waiting to receive acknowledgement, from the second data storage system, indicating that the second data storage system has received writes of the first cycle number and applied writes of the first cycle number−1 to a second storage device of the second group of devices, wherein the second storage device is the corresponding storage device for the first storage device, and wherein the current transmit cycle for which data for the first storage device is being transmitted from the first data storage system to the second data storage system is not restricted by the first cycle number.

15. The non-transitory computer readable medium of claim 14, wherein the first group of storage devices and the second group of storage devices are logical devices.

16. The non-transitory computer readable medium of claim 14, wherein no write from cycle N−1 directed to the first group of storage devices is applied to any storage device of the second group of storage devices until all writes of cycle N−2 directed to the first group of storage devices are applied to the second group of storage devices.

17. The non-transitory computer readable medium of claim 16, wherein no write from cycle N directed to the first group of storage devices is applied to any storage device of the second group of storage devices until all writes of cycle N−1 directed to the first group of storage devices are applied to the second group of storage devices.

18. The non-transitory computer readable medium of claim 14, wherein the method further comprises:

performing an update of the first cycle number to N directed with respect to the first storage device responsive to the first data storage system receiving the acknowledgement regarding cycle N−1 with respect to the first storage device, wherein transmitting at least some of the writes of cycle N that are directed to the first storage device to the second data storage system is performed prior to performing the update of the first cycle number to N.

\* \* \* \* \*